(12) United States Patent
Wei

(10) Patent No.: US 9,544,423 B2
(45) Date of Patent: Jan. 10, 2017

(54) CHANNEL ORDERING FOR MULTI-CHANNEL MULTI-CARRIER COMMUNICATION SYSTEMS

(71) Applicant: Futurewei Technologies, Inc., Plano, TX (US)

(72) Inventor: Dong Wei, Austin, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/087,496

(22) Filed: Mar. 31, 2016

(65) Prior Publication Data

US 2016/0295014 A1 Oct. 6, 2016

Related U.S. Application Data

(60) Provisional application No. 62/141,088, filed on Mar. 31, 2015.

(51) Int. Cl.
*H04M 1/24* (2006.01)
*H04M 3/08* (2006.01)
(Continued)

(52) U.S. Cl.
CPC ............... *H04M 3/34* (2013.01); *H04B 3/32* (2013.01); *H04M 3/304* (2013.01)

(58) Field of Classification Search
CPC .......... H04L 5/023; H04L 5/0023; H04L 5/14; H04L 27/2608; H04L 2025/03413; H04L 2025/03477; H04L 2025/03605; H04L 2025/0377; H04L 2025/03783; H04L 5/0007; H04L 5/0046; H04L 5/006; H04L 5/0064; H04B 3/32; H04M 11/062; Y02B 60/36
(Continued)

(56) References Cited

U.S. PATENT DOCUMENTS 6,408,022 B1 * 6/2002 Fertner ............... H04L 25/0202
375/229
6,459,678 B1 * 10/2002 Herzberg ................ H04L 5/023
370/203

(Continued)

OTHER PUBLICATIONS

Hekrdla, et la., "Ordered Tomlinson-Harashima Precoding in G.fast Downstream," Globecom, Dec. 2015, 6 pages.

(Continued)

*Primary Examiner* — Binh Tieu
(74) *Attorney, Agent, or Firm* — Conley Rose, P.C.

(57) ABSTRACT

A method implemented in a network element (NE), comprising determining, via a processor of the NE, a channel order for a set of subscriber lines at each of a plurality of subcarriers to equalize data rates of the set of subscriber lines, wherein the set of subscriber lines is coupled to a plurality of remote NEs associated with a plurality of users, determining, via the processor, parameters for a crosstalk mitigation filter for a first subcarrier from the plurality of subcarriers according to channel responses of the set of subscriber lines at the first subcarrier and a first channel order from the channel orders for the first subcarrier, and sending, via a transmitter of the NE, parameters of the crosstalk mitigation filter to facilitate joint processing of data of the plurality of users for crosstalk mitigation.

20 Claims, 12 Drawing Sheets

(51) Int. Cl.
- H04M 3/22 (2006.01)
- H04M 3/34 (2006.01)
- H04M 3/30 (2006.01)
- H04B 3/32 (2006.01)

(58) Field of Classification Search
USPC ............. 379/1.01, 1.03, 1.04, 22.08, 28, 32.01,379/32.04, 399.01, 399.02, 406.01, 406.05,379/406.06, 406.08, 406.1
See application file for complete search history.

(56) References Cited

U.S. PATENT DOCUMENTS

| | | | | |
|---|---|---|---|---|
| 2002/0181389 A1* | 12/2002 | Giannakis | ............. | H04L 25/022 370/208 |
| 2012/0121029 A1* | 5/2012 | Ahrndt | ............. | H04B 3/32 375/260 |
| 2012/0201178 A1* | 8/2012 | Thyagarajan | ......... | H04L 5/0064 370/310 |
| 2013/0034133 A1* | 2/2013 | Gupta | ............. | H04M 11/062 375/219 |

OTHER PUBLICATIONS

Ginis, et al., "Vectored Transmission for Digital Subscriber Line Sytems," IEEE Journal on Selected Areas in Communications, vol. 20, No. 5, Jun. 2002, pp. 1085-1104.

"G.fast: Ad-Hoc Report on Vectoring Simulation Conditions," ITU—Telecommunication Standardization Sector, Study Group 15, 2012-11-4A-082, Chengdu, China, Nov. 5-9, 2012; 2 pages.

Huang, et al., "Analysis of Tomlinson-Harashima Precoding in Multiuser MIMO Systems with Imperfect Channel State Information," IEEE Transactions on Vehicular Technology, vol. 57, No. 5, Sep. 2008, pp. 2856-2867.

G. Ginis and J. Cioffi, "A multi-user precoding scheme achieving crosstalk cancellation with application to DSL systems," in Signals, Systems and Computers, 2000. Conference Record of the Thirty-Fourth Asilomar Conference on, vol. 2, Oct. 2000, pp. 1627-1631.

D. Wubben, R. Böhnke, J. Rinas, V. Kühn, and K.-D. Kammeyer,"E_cient Algorithm for Decoding Layered Space-Time Codes," Electronics Letters, vol. 37, No. 22, Oct. 25, 2001, pp. 1348-1350.

S. Huberman, C. Leung, and T. Le-Ngoc, "Dynamic Spectrum Management (DSM) Algorithms for Multi-User xDSL," Communications Surveys Tutorials, IEEE, vol. 14, No. 1, 2012, pp. 109-130.

M. Timmers, M. Guenach, C. Nuzman, and J. Maes, "G.fast: Evolving the Copper Access Network," Communications Magazine, IEEE, vol. 51, No. 8, Aug. 2013, pp. 74-79.

R. Cendrillon, M. Moonen, J. Verlinden, T. Bostoen, and G. Ginis, "Improved Linear Crosstalk Precompensation for DSL," in Acoustics, Speech, and Signal Processing, 2004. Proceedings. (ICASSP '04). IEEE International Conference on, vol. 4, May 2004, pp. iv-1053-6.

R. Fischer and C. Windpassinger, "Improved MIMO Preceding for Decentralized Receivers Resembling Concepts from Lattice Reduction," Global Telecommunications Conference, 2003. GLOBECOM '03. IEEE, vol. 4, Dec. 2003, pp. 1852-1856.

D. Wubben, D. Seethaler, J. Jalden, and G. Matz, "Lattice Reduction," Signal Processing Magazine, IEEE, vol. 28, No. 3, pp. 70-91, May 2011.

K. Zu, R. de Lamare, and M. Haardt, "Multi-branch Tomlinson-Harashima Precoding Design for MU-MIMO Systems: Theory and Algorithms," Communications, IEEE Transactions on, vol. 62, No. 3, Mar. 2014, pp. 939-951.

F. Muller, C. Lu, P.-E. Eriksson, S. Host, and A. Klautau, "Optimizing Power Normalization for G.fast Linear Precoder by Linear Programming," Communications (ICC), 2014 IEEE International Conference, Jun. 2014, pp. 4160-4165.

K. Kerpez and G. Ginis, "Software-Defined Access Network (SDAN)," Information Sciences and Systems (CISS), 2014 48th Annual Conference, Mar. 2014, pp. 1-6.

P. Wolniansky, G. Foschini, G. Golden, and R. Valenzuela, "V-BLAST: An Architecture for Realizing Very High Data Rates over the Rich-scattering Wireless Channel," Signals, Systems, and Electronics, 1998. Issse 98. 1998 URSI International Symposium, Sep. 1998, pp. 295-300.

* cited by examiner

```
% initialization
```
Line 610 :  $\{Q_K, R_K\} = \text{QR\_decomp}(H_K^T)$
Line 620 :  $b_K[n] = \text{bit\_load}(R_K[n,n])  \quad \forall n$
Line 630 :  $b_K[n] \to r[n]  \quad \forall n$
Line 641 :  for $i = K-1$ to $1$      % from the highest sub-carrier to the lowest sub-carrier
Line 642 :     $\pi = \text{sort}(r[n])$
Line 643 :     $\{Q_i, R_i\} = \text{QR\_decomp}((P_\pi H_i P_\pi^T)^T)$
Line 644 :     $d_i[n] = \text{bit\_load}(R_i[n,n])  \quad \forall n$
Line 645 :     $b_i = P_\pi^T d_i$
         $r[n] + b_i[n] \to r[n]  \quad \forall n$
```
end
```

Lines 641–645 form Loop 640. Figure labeled 600.

FIG. 6

CHANNEL ORDERING FOR MULTI-CHANNEL MULTI-CARRIER COMMUNICATION SYSTEMS

CROSS-REFERENCE TO RELATED APPLICATIONS

The present application claims priority to U.S. Provisional Patent Application 62/141,088, filed Mar. 31, 2015 by Dong Wei, and entitled "Channel Ordering for Multi-Channel Multi-Carrier Communication Systems," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies employ twisted pairs or twisted pair copper cables to carry high-speed broadband data signals over local telephone network. DSL services are delivered simultaneously with wired telephone service or plain old telephone service (POTS) on the same twisted pair. Voice signals or POTS signals are transmitted using frequency bands up to about 4 kilohertz (kHz), whereas DSL signals are transmitted at frequencies above 4 kHz. International Telecommunication Union Telecommunication Sector (ITU-T) defined various DSL standards including asymmetric DSL (ADSL), ADSL2, ADSL2plus, very-high-bit rate DSL (VDSL), and VDSL2, and fast access to subscriber terminals (G.fast) with increasing data rates. The increasing data rates are achieved by employing greater bandwidths and/or advanced signal processing techniques. However, high data rates that approach about 150 megabits per second (Mbps) up to about 1 gigabits per second (Gbps) are only achieved at a very short distance or reach, for example, less than about 500 meters (m).

SUMMARY

In one embodiment, the disclosure includes a method implemented in a network element (NE), comprising determining, via a processor of the NE, a channel order for a set of subscriber lines at each of a plurality of subcarriers to equalize data rates of the set of subscriber lines, wherein the set of subscriber lines is coupled to a plurality of remote NEs associated with a plurality of users, determining, via the processor, parameters for a crosstalk mitigation filter for a first subcarrier from the plurality of subcarriers according to channel responses of the set of subscriber lines at the first subcarrier and a first channel order from the channel orders for the first subcarrier, and sending, via a transmitter of the NE, parameters of the crosstalk mitigation filter to a coordinated multi-channel multi-carrier communication apparatus that is coupled to the plurality of remote NEs via the set of subscriber lines to facilitate joint processing of data of the plurality of users for crosstalk mitigation. In some embodiments, the disclosure also includes wherein determining the parameters for the crosstalk mitigation filter for the first subcarrier comprises obtaining a channel matrix for the channel responses of the set of subscriber lines at the first subcarrier, ordering rows of the channel matrix according to the first channel order to produce an ordered channel matrix, perform QR decomposition on the ordered channel matrix to obtain a unitary matrix Q and a triangular matrix R, and generating the parameters of the crosstalk mitigation filter according to the unitary matrix Q and the triangular matrix R, and/or wherein the multi-channel multi-carrier apparatus is a digital subscriber line access multiplexer (DSLAM), wherein the plurality of remote NEs are customer premise equipments (CPEs), wherein the channel responses are downstream (DS) channel responses from the DSLAM to the CPEs, wherein the crosstalk mitigation filter is a DS far-end crosstalk (FEXT) pre-coder, and wherein the method further comprises performing a transpose on the channel matrix prior to ordering the rows of the channel matrix, and/or wherein the multi-channel multi-carrier apparatus is a DSLAM, wherein the plurality of remote NEs are CPEs, wherein the channel responses are upstream (US) channel responses from the plurality of CPEs to the DSLAM, and wherein the crosstalk mitigation filter is a US FEXT canceller, and/or wherein determining the channel orders for the set of subscriber lines comprises determining a second number of bits to be allocated to each subscriber line at a second subcarrier of the plurality of subcarriers, sorting the second numbers of bits for the set of subscriber lines in a first ascending order to produce a first sort order, and assigning the first sort order to the first channel order for the set of subscriber lines at the first subcarrier, and/or wherein determining the channel orders for the set of subscriber lines further comprises determining a first number of bits to be allocated to each subscriber line at the first subcarrier according to a diagonal element of the triangular matrix R corresponding to each subscriber line, determining a total number of bits to be allocated to each subscriber line by summing a corresponding first number of bits and a corresponding second number of bits, sorting the total numbers of bits for the set of subscriber lines in a third ascending order to produce a third sort order, and assigning the third sort order to a third channel order of the channel orders for the set of subscriber lines at a third subcarrier of the plurality of subcarriers, and/or wherein determining the channel orders for the set of subscriber lines further comprises determining the channel orders sequentially from a highest subcarrier of the plurality of subcarriers to a lowest subcarrier of the plurality of subcarriers, wherein the first subcarrier is positioned between the second subcarrier and the third subcarrier in a frequency spectrum, and wherein the second subcarrier is the highest subcarrier, and/or wherein determining the channel orders for the set of subscriber lines further comprises assigning an arbitrary order to a second of the channel orders for the set of subscriber lines at the second subcarrier, and/or wherein determining the channel orders for the set of subscriber lines further comprises sorting attenuations of the set of subscriber lines at the second subcarrier in a descending order to produce a second sort order, and assigning the second sort order to a second of the channel orders for the set of subscriber lines at the second subcarrier, and/or wherein determining the channel orders for the set of subscriber lines comprises determining a first number of bits to be allocated to each subscriber line at a first group of the plurality of subcarriers, sorting the first numbers of bits for the set of subscriber lines in a first ascending order to produce a first sort order, and assigning the first sort order to a second group of the channel orders for the set of subscriber lines at a second group of the plurality of subcarriers, and wherein the first group of the plurality of subcarriers is adjacent to the second group of the plurality of subcarriers in a frequency spectrum.

In another embodiment, the disclosure includes a multi-channel multi-carrier communication apparatus comprising a plurality of transmitters coupled to a plurality of NEs associated with a plurality of users via a set of subscriber lines arranged in a first order, a processor coupled to the plurality of transmitters and configured to obtain a plurality of first modulation symbols for the plurality of users, wherein the plurality of first modulation symbols is associated with a first subcarrier, and apply a pre-coder to jointly pre-code the plurality of first modulation symbols in a second order that maximizes a first minimum rate for the set of subscriber lines to produce pre-coded data, wherein the pre-coder is associated with first channel responses of the set of subscriber lines at the first subcarrier, and a transmitter coupled to the processor and configured to transmit the pre-coded data to the plurality of NEs via the set of subscriber lines at the first subcarrier. In some embodiments, the disclosure also includes wherein the first channel responses of the set of subscribe lines at the first subcarrier are represented by a channel matrix, wherein diagonal elements of the channel matrix are associated with direct channels of the set of subscriber lines, wherein off-diagonal elements of the channel matrix are associated with FEXT channels among the set of subscriber lines, wherein rows of the channel matrix are in the first order, wherein the pre-coder is a non-linear pre-coder dependent on an ordered channel matrix corresponding to a first transpose of the channel matrix with the rows arranged in the second order, and wherein the second order corresponds to a third order of the set of subscriber lines arranged in an ascending order of number of bits allocated to the set of subscriber lines at one or more subcarriers, and/or wherein the non-linear pre-coder comprises a feedback (FB) filter comprising a transfer function as shown below:

$$I - \text{diag}(R)^{-1} \times R^T$$

where I represents an identity matrix, R represents a triangular matrix based on a QR decomposition of the ordered channel matrix, $\text{diag}(R)^{-1}$ represents an inverse of diagonal elements of the triangular matrix, and $R^T$ represents a second transpose of the triangular matrix, and/or wherein the processor is further configured to apply a feedforward (FF) filter to the pre-coded data according to a unitary matrix Q based on the QR decomposition of the first transpose of the ordered channel matrix, and/or wherein the first minimum rate of the set of subscriber lines is in a first direction from the apparatus to the plurality of NEs, wherein the apparatus further comprises a receiver configured to receive a plurality of signals comprising a plurality of second modulation symbols at a second subcarrier from the plurality of NEs, wherein the processor is further configured to apply a non-linear canceller to the plurality of second modulation symbols in a third order that maximizes a second minimum rate of the set of subscriber lines in a second direction from the plurality of NEs to the apparatus, and wherein the non-linear canceller is associated with second channel responses of the set of subscriber line in the second direction at the second subcarrier, and/or wherein the second channel responses of the set of subscriber lines are represented by a channel matrix, wherein diagonal elements of the channel matrix are associated with direct channels of the set of subscriber lines in the second direction, wherein off-diagonal elements of the channel matrix are associated with FEXT channels among the set of subscriber lines in the second direction, wherein rows of the channel matrix are in the first order, wherein the non-linear canceller comprises a feedback (FB) filter dependent on an ordered channel matrix corresponding to the channel matrix with the rows arranged in the third order, and wherein the FB filter comprises a transfer function as shown below:

$$I - \text{diag}(R)^{-1} \times R^T$$

where I represents an identity matrix, R represents a triangular matrix based on a QR decomposition of the ordered channel matrix, $\text{diag}(R)^{-1}$ represents an inverse of diagonal elements of the triangular matrix, and $R^T$ represents a third transpose of the triangular matrix, and/or wherein the apparatus is a DSLAM, and wherein the plurality of NEs are CPEs.

In yet another embodiment, the disclosure includes a method implemented by a multi-channel multi-carrier communication apparatus, the method comprising obtaining a plurality of first modulation symbols for a plurality of users associated with a plurality of NEs coupled to the apparatus via a set of subscriber lines arranged in a first order, wherein the plurality of first modulation symbols is associated with a first subcarrier, applying a pre-coder to jointly pre-code the plurality of first modulation symbols in a second order that maximizes a minimum rate for the set of subscriber lines to produce pre-coded data, wherein the pre-coder is associated with channel responses of the set of subscriber lines at the first subcarrier, and transmitting the pre-coded data to the plurality of users via the set of subscriber lines at the first subcarrier. In some embodiments, the disclosure also includes wherein the channel responses of the set of subscribe lines are represented by a channel matrix, wherein diagonal elements of the channel matrix are associated with direct channels of the set of subscriber lines, wherein off-diagonal elements of the channel matrix are associated with FEXT channels among the set of subscriber lines, wherein rows of the channel matrix correspond to the set of subscriber lines in the first order, wherein the pre-coder is dependent on an ordered channel matrix corresponding to a first transpose of the channel matrix with the rows arranged in the second order, and wherein the second order corresponds to a third order of the set of subscriber lines arranged in an ascending order of number of bits allocated to the set of subscriber lines at one or more subcarriers, and/or wherein the pre-coder is a QR-based Tomlinson-Harashima pre-coder (QR-THP) ordered according to the second order, and wherein the pre-coder comprises a feedback (FB) filter comprising a transfer function as shown below:

$$I - \text{diag}(R)^{-1} \times R^T$$

where I represents an identity matrix, R represents a triangular matrix based on a QR decomposition of a first transpose of the ordered channel matrix, and $R^T$ represents a second transpose of the triangular matrix For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

FIG. 6 illustrates an embodiment of a pseudo code for implementing a dynamic channel ordering scheme.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The various ITU-T DSL standards, such as the ADSL, the ADSL2, ADSL2plus, VDSL, VDSL2, and G.fast standards, are deployed between a central office (CO) or a distribution point (DP) and customer premises. Data are modulated using discrete multi-tone (DMT) modulation and transmitted using digital baseband transmission. DMT modulation divides a signal spectrum of a subscriber line into a number of discrete frequency bands and assigns a number of bits to each frequency band according to a channel conditional of each frequency band of the subscriber line. The frequency bands are also referred to as tones or subcarriers. The ADSL, ADSL2, ADSL2plus, VDSL, and VDSL2 standards employ frequency-domain duplexing (FDD), where US transmission and DS transmission occur simultaneously at two different group of frequency bands. US refers to the transmission direction from a CPE to a CO, whereas DS refers to the transmission direction from a CO to a CPE. The G.fast standard employs TDD, where US transmission and DS transmission occupy the same frequency band, but occur at different time intervals.

Figure 1:
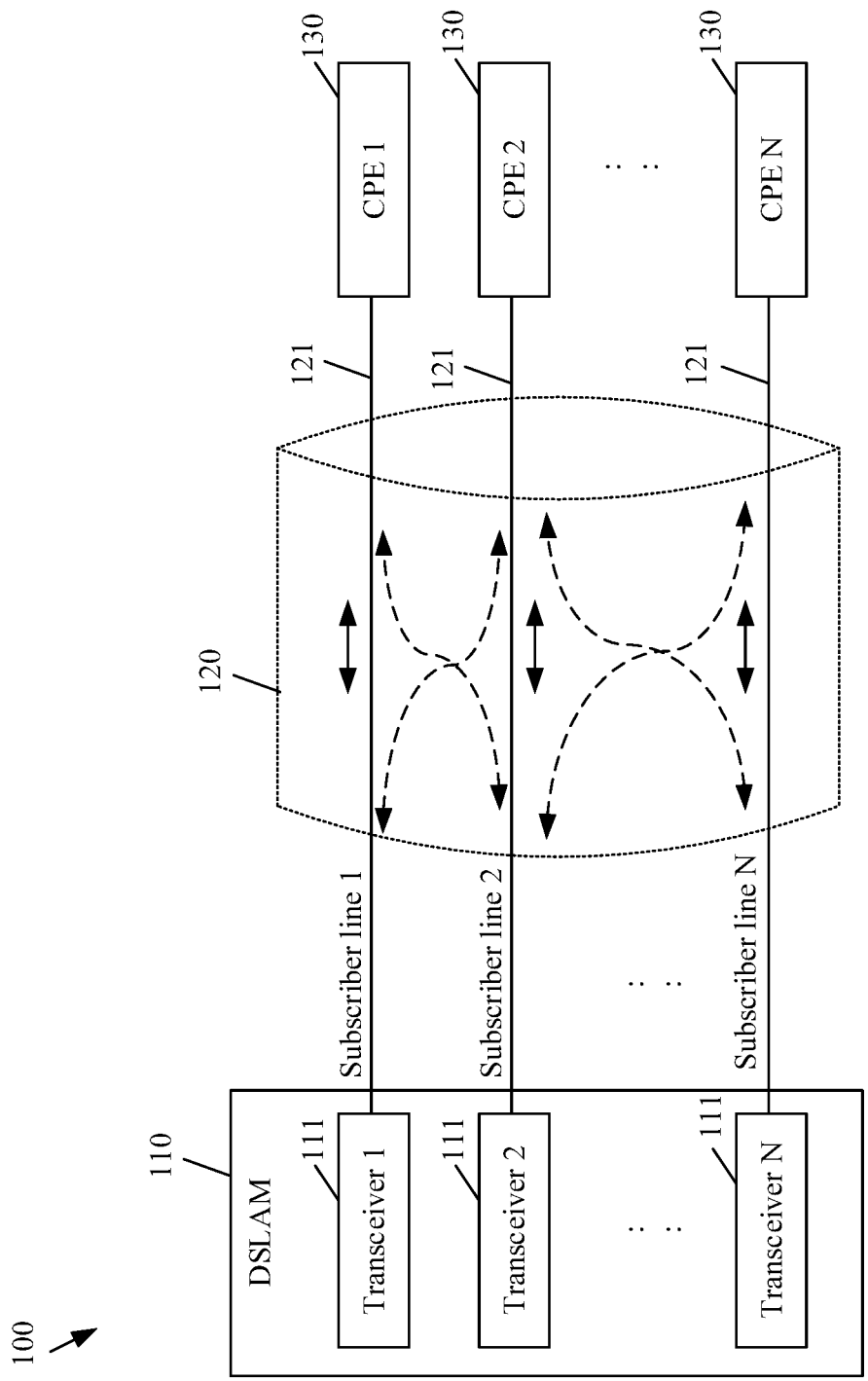
FIG. 1 is a schematic diagram of an embodiment of a DSL system.

FIG. 1 is a schematic diagram of an embodiment of a DSL system 100. The system 100 may be any DSL system as defined by the ITU-T. The system 100 comprises a DSLAM 110 coupled to a plurality of CPEs 130 via a plurality of subscriber lines 121 bundled in a cable binder 120. The subscriber lines 121 are also referred to as DSL lines or lines. The DSLAM 110 may be located at an operator end of the system 100 such as a CO, an exchange, a distribution point unit (DPU), or a cabinet, which is connected to a backbone network such as the Internet via one or more intermediate networks. The intermediate networks may include an optical distribution network (ODN). The CPEs 130 are shown as CPE 1 to CPE N and are located at distributed customer premises and may be further connected to devices such as telephones, routers, and computers. The subscriber lines 121 are twisted copper pairs. The subscriber lines are shown as subscriber line 1 to N. The system 100 may be configured as shown or alternatively configured as determined by a person of ordinary skill in the art to achieve similar functionalities.

The DSLAM 110 may be any device configured to communicate with the CPEs 130. The DSLAM 110 terminates and aggregates DSL signals from the CPEs 130 and hands the aggregated DSL signals off to other network transports. In a DS direction, the DSLAM 110 forwards data received from a backbone network to the CPEs 130. In a US direction, the DSLAM 110 forwards data received from the CPEs 130 onto the backbone network. The DSLAM 110 comprises a plurality of transceivers 111 shown as Transceiver 1 to Transceiver N. Each transceiver 111 is coupled to a CPE 130 via a corresponding subscriber line 121. Each transceiver 111 comprises a transmitter and a receiver configured to transmit and receive signals over a corresponding subscriber line 121. The DSLAM 110 may further comprise other functional units for performing physical (PHY) layer signal processing, open system interconnection (OSI) model layer 2 (L2) and above (L2+) processing, activations of the CPEs 130, resource allocation, and other functions associated with the management of the system 100.

The CPEs 130 may be any devices configured to communicate with the DSLAM 110. The CPEs 130 act as intermediaries between the DSLAM 110 and connected devices to provide Internet access to the connected devices. In a DS direction, the CPEs 130 forward data received from the DSLAM 110 to corresponding connected devices. In a US direction, the CPEs 130 forward data received from the connected devices to the DSLAM 110. Although the specific configuration of the CPEs 130 may vary, each CPE 130 may comprise a transceiver configured to transmit and receive signals over a corresponding subscriber line 121. The CPEs 130 may further comprise other functional units for performing PHY layer processing, L2+ processing, and other management related functions.

In the system 100, the DSLAM 110 and the CPEs 130 negotiate configuration parameters for data transmission in both US and DS directions during a phase known as initialization or training before actual transmissions of information data during a phase known as showtime. Some examples of configuration parameters are channel information and bit allocations. Channel information is associated with channel conditions of the subscriber lines 121 at different tones. Bit allocation may include a number of bits to be allocated or loaded at each frequency tone based on the channel conditions.

As the lengths of the subscriber lines 121 become shorter, for example, less than about 500 m, FEXT becomes a dominant noise source in the system 100. FEXT refers to the interference at a far-end of the subscriber lines 121 induced by transmissions at an interfering transmitter. In the system 100, the solid arrows show direct channels between the DSLAM 110 and a CPE 130 and the dashed arrows show FEXT channels between the DSLAM 110 and the CPEs 130. FEXT may occur in both US and DS directions. US FEXT refers to the interference experienced by a receiver of an $m^{th}$ transceiver 111 at the DSLAM 110 coupled to an $m^{th}$ subscriber line 121 due to US transmission of an $n^{th}$ CPE 130 over an $n^{th}$ subscriber line 121. Conversely, DS FEXT refers to the interference experience by a receiver of an $m^{th}$ CPE 130 coupled to an $m^{th}$ subscriber line 121 due to DS transmission of an $n^{th}$ transceiver 111 at the DSLAM 110 over an $n^{th}$ subscriber line 121.

In an embodiment, the system 100 employs vectored processing to mitigate US FEXT and DS FEXT. Vectored processing is a technique that synchronizes multiple transceivers such as the transceivers 111 communicating through twisted copper pairs such as the subscriber lines 121 within a cable such as the cable binder 120 to enable FEXT cancellation. Since the transceivers 111 at the DSLAM 110 are collocated, whereas the transceivers of the CPEs 130 are distributed over various customer premises, vectored-based FEXT cancellation are coordinated and performed at the DSLAM 110 and the CPEs 130 may receive and transmit without coordination. For example, in a DS direction, the DSLAM 110 further comprises a crosstalk pre-coder configured to pre-distort DS signals based on DS FEXT characteristics over the subscriber lines 121 prior to transmission so that the effect of DS FEXT is reduced or cancelled when the CPEs 130 receive the pre-distorted DS signals. In a US direction, the DSLAM 110 further comprises a crosstalk canceller configured to reduce or cancel US FEXT from received US signals. Vector-based crosstalk pre-coding jointly processes all DS signals on a tone-by-tone basis or a subcarrier-by-subcarrier basis. Similarly, vector-based crosstalk cancellation jointly processes all US signals on a tone-by-tone basis or a subcarrier-by-subcarrier basis. For example, a frequency-domain channel matrix, denoted as H, is defined per tone or per subcarrier, for both US and DS directions as follows:

$$H = \begin{bmatrix} h_{11} & h_{12} & \cdots & \cdots & h_{1N} \\ h_{21} & h_{22} & \cdots & \cdots & h_{2N} \\ \cdots & \cdots & \cdots & \cdots & \cdots \\ h_{N1} & h_{N2} & \cdots & \cdots & h_{NN} \end{bmatrix}, \quad (1)$$

where the diagonal elements $h_{mm}$ represent direct channels between a given transceiver 111 at the DSLAM 110 and a corresponding CPE 130. The off-diagonal elements $h_{mn}$, where $m \approx n$, represents FEXT channels and refers to the channel from an $m^{th}$ transmitter into an $n^{th}$ receiver. All elements $h_{mn}$ are complex scalar values for $1 < m < N$ and $1 < n < N$. The details of vectored-based crosstalk pre-coding and cancellation are described more fully below.

Figure 2:
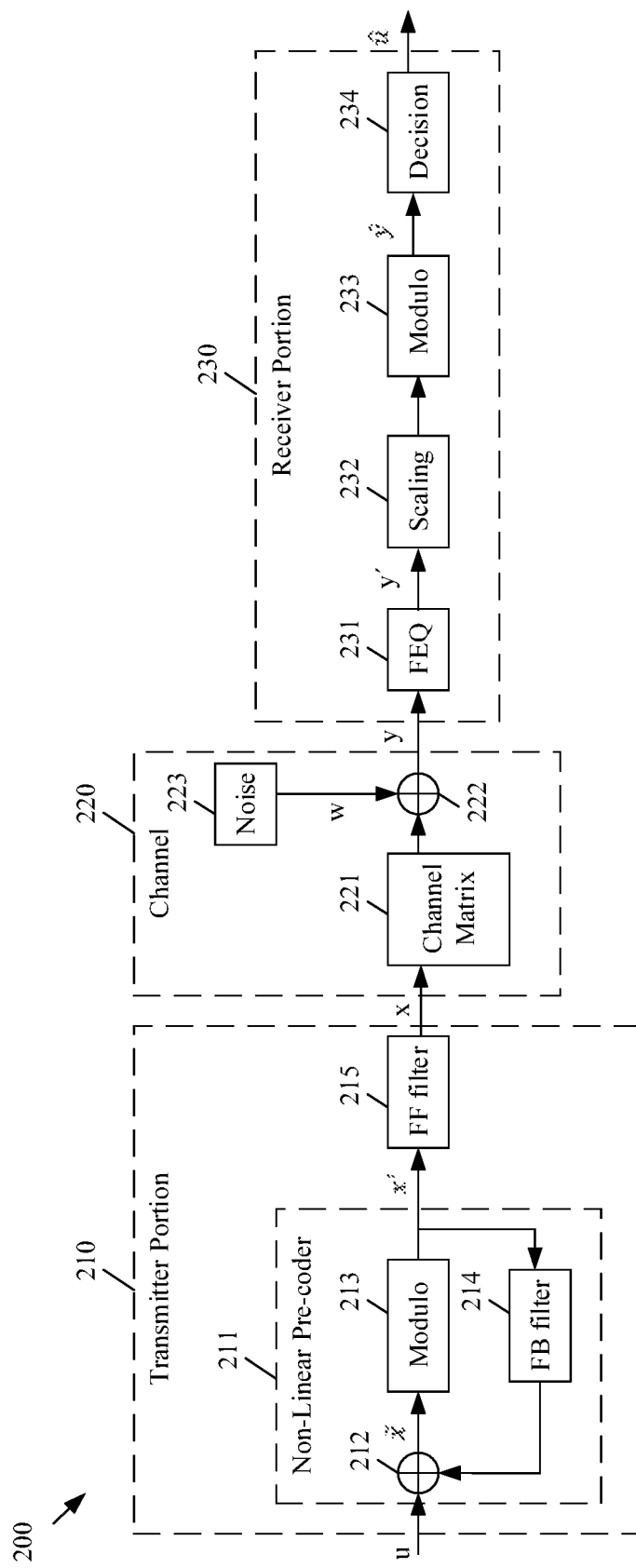
FIG. 2 is a functional diagram of an embodiment of a portion of a multi-channel multi-carrier system that implements non-linear pre-coding for DS FEXT mitigation.

FIG. 2 is a functional diagram of an embodiment of a portion of a multi-channel multi-carrier system 200 that implements non-linear pre-coding for DS FEXT mitigation. The system 200 is similar to the system 100, but illustrates a detailed view of DS FEXT pre-coding in the system 100 at the DSLAM 110. The system 200 employs QR decomposition-based Tomlinson-Harashima pre-coding (QR-THP) as described in George Ginis, et al., "Vectored Transmission for Digital Subscriber Line Systems," Institute of Electrical and Electronics Engineers (IEEE) Journal on Selected Areas in Communications, Vol. 20, No. 5, June 2002, which is incorporated by reference. The system 200 comprises a transmitter portion 210 coupled to a receiver portion 230 via a channel 220. The transmitter portion 210 corresponds to a transmitter portion of the DSLAM 110. The receiver portion 230 corresponds to a receiver portion of one of the CPEs 130. The channel 220 corresponds to DSL channels generated by the subscriber lines 121. The transmitter portion 210 comprises a non-linear pre-coder 211 and a feedforward (FF) filter 215. The non-linear pre-coder 211 comprises a summing block 212, a modulo block 213, and a feedback (FB) filter 214. The pre-coder 211 and the FF filter 215 are coupled to the transceivers 111 at the DSLAM 110 of FIG. 1. The channel portion 220 comprises a channel matrix block 221, a summing block 222, and a noise block 223. The receiver portion 230 comprises a frequency-domain equalizer (FEQ) block 231, a scaling block 232, a modulo block 233, and a decision block 234.

In the system 200, DS FEXT pre-coding is performed per subcarrier. As an example, the system 200 comprises N number of lines such as the subscriber lines 121 each connecting to a corresponding CPE such as the CPE 130 and uses K number of subcarriers for data transmissions, where N and K are positive integers. The channel matrix block 221 models channel responses of the N lines at a particular subcarrier by a N×N frequency-domain channel matrix, denoted as H, as shown in equation (1). DSL channels are relatively static, and thus the channel matrix H may be pre-determined, for example, during deployment or during an initialization stage. As such, the transmitter portion 210 may use characteristics of the channel matrix H to pre-compensate the channel effect such as FEXT. The noise block 223 models additive white Gaussian noise (AWGN) in the DSL channels by a noise vector, denoted as w, at the particular subcarrier. The summing block 222 is coupled to the channel matrix block 221 and the noise block 223. The summing block 222 is configured to add the noise vector w to the channel matrix H.

In QR-THP, the transpose of the channel matrix H, denoted as $H^T$, is decomposed into a N×N matrix Q, and a N×N matrix R via QR decomposition as shown below:

$$H^T = Q \times R. \quad (2)$$

The matrix Q is a unitary matrix, where the conjugate transpose of Q equals to the inverse of Q. The matrix R is an upper-triangular matrix. The matrix Q forms the FF filter 215 and the matrix R forms the FB filter 214.

In the transmitter portion 210, the non-linear pre-coder 211 receives an input signal vector, denoted as u, which comprises a sequence of complex DS modulation symbols (e.g., $u = [u_0, u_1, \ldots, u_N]$) each corresponding to a CPE. Each DS modulation symbol is to be transmitted to a corresponding CPE via a corresponding line at the particular subcarrier. The non-linear pre-coder 211 jointly processes all the DS modulation symbols of all N lines for the particular subcarrier. The FB filter 214 comprises a transfer function as shown below:

$$I - \text{diag}(R)^{-1} \times R^T, \quad (3)$$

where I represents an identity matrix, $\text{diag}(R)^{-1}$ represents an inverse of diagonal elements of the matrix R, and $R^T$ represents a transpose of the matrix R. The FB filter 214 filters the output of the modulo block 213, denoted as x', which is referred to as a pre-coded signal vector. The summing block 212 is coupled to the modulo block 213 and the FB filter 214. The output of the summing block 215, denoted as $\tilde{x}_m$, is computed as shown below:

$$\tilde{x}_m = u_m - \frac{1}{r_{mm}} \sum_{n=1}^{m-1} r_{nm} x'_n, \quad (4)$$

where m varies from 1 to N, $\tilde{x}_m$ represents an output of the FB filter 214 for the $m^{th}$ line, $u_m$ represents a received complex DS symbol for the $m^{th}$ line, $r_{mm}$ represents a diagonal element in the matrix R at an $m^{th}$ row and an $m^{th}$ column, and $r_{nm}$ represents an off-diagonal element in the matrix R at an $n^{th}$ row and an $m^{th}$ column. The modulo block 213 is configured to perform a modulo operation based on a modulo threshold, denoted as M, as shown below:

$$x'_m = \left[-\frac{M}{2} + \left(\operatorname{Re}(\tilde{x}_m) + \frac{M}{2}\right) \bmod M\right] + \quad (5)$$
$$j \times \left[-\frac{M}{2} + \left(\operatorname{Im}(\tilde{x}_m) + \frac{M}{2}\right) \bmod M\right],$$

where $\operatorname{Re}(\tilde{x}_m)$ represents the real component of $\tilde{x}_m$, $\operatorname{Im}(\tilde{x}_m)$ represents the imaginary component of $\tilde{x}_m$, and mod is a modulo operation as shown below:

$$a \bmod b = a - b \times \operatorname{floor}\left(\frac{a}{b}\right). \quad (6)$$

It should be noted that M is dependent on the constellation of the DS modulation symbols.

The FF filter 215 is coupled to non-linear pre-coder 211 and configured to multiply the pre-coded signal vector x' by the matrix Q to produce a transmit signal vector, denoted as x. The non-linear pre-coder 211 pre-compensates DS FEXT according to the channel matrix H. Thus, after transmission of the transmit signal vector x over a channel represented by the channel portion 220, a received signal vector, denoted as y, received by the receiver portion 230 is free of DS FEXT or comprises a minimal amount of DS FEXT.

In the receiver portion 230, the FEQ block 231 is configured to remove or equalize the channel effect of the channel 220 in the received signal vector y to produce an equalized signal vector, denoted as y'. The scaling block 232 is coupled to the FEQ block 231 and configured to scale the equalized signal vector y' by the inverse of the diagonal elements of the matrix R. The receive modulo block 233 is coupled to the scaling block 232 and configured to perform a modulo operation on the scaled intermediate signal vector to produce an intermediate signal vector, denoted as $\hat{y}_m$. The operations of the scaling block 232 and the receive modulo block 233 are shown below:

$$\hat{y}_m = \left[-\frac{M}{2} + \left(\operatorname{Re}\left(\frac{y'_m}{r_{mm}}\right) + \frac{M}{2}\right) \bmod M\right] + \quad (7)$$
$$j \times \left[-\frac{M}{2} + \left(\operatorname{Im}\left(\frac{y'_m}{r_{mm}}\right) + \frac{M}{2}\right) \bmod M\right],$$

where m varies from 1 to N, $\hat{y}_m$ represents the output of the receive modulo block for the $m^{th}$ CPE and $y'_m$ represents a frequency-domain equalized symbol at the particular subcarrier for the $m^{th}$ CPE.

The decision block 234 is coupled to the modulo operator block 233 and configured to perform a slicing operation to determine the data bits in the received symbols for the $m^{th}$ CPE. The transmitter portion 210 repeats the computations of equations (3), (4), and (5) for each of the K subcarriers. The receiver portion 220 repeats the computation of equation (7) for each of the K subcarriers. However, it should be noted that $\hat{y}_m$ is computed by an $m^{th}$ CPE.

Figure 3:
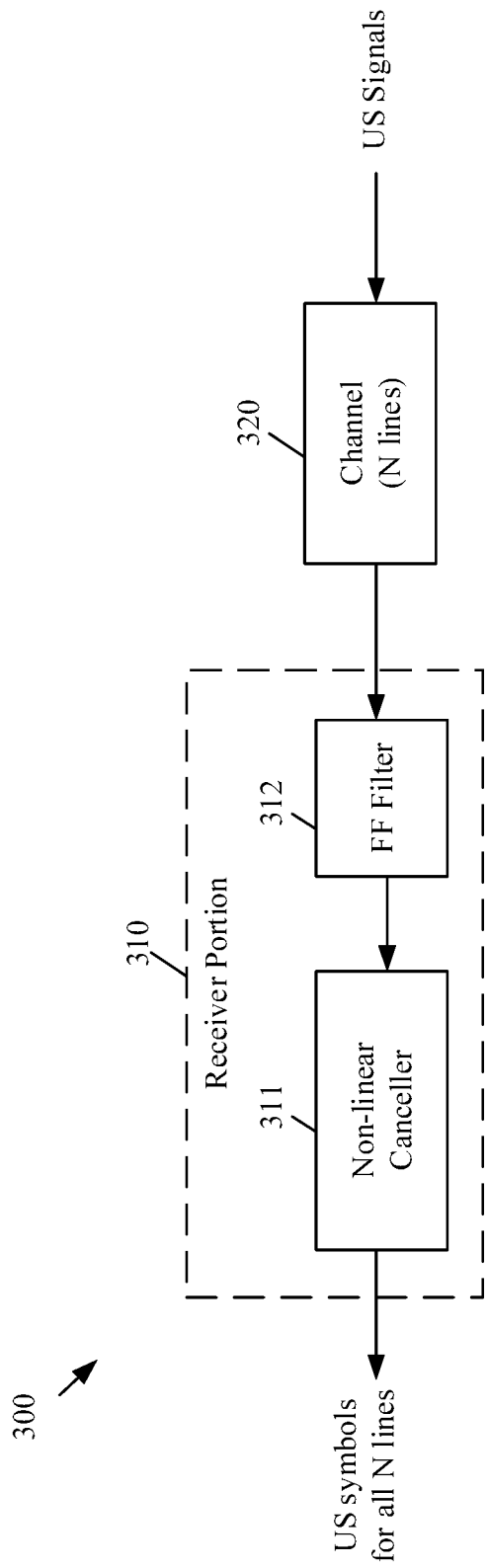
FIG. 3 is a functional diagram of an embodiment of a portion of a multi-channel multi-carrier system that implements non-linear post-cancellation of US FEXT.

FIG. 3 is a functional diagram of an embodiment of a portion of a multi-channel multi-carrier system 300 that implements non-linear post-cancellation of US FEXT. The system 300 is similar to the system 100, but illustrates US FEXT post-cancellation at the DSLAM 110. The system 300 comprises a receiver portion 310 and a channel portion 320. The channel portion 320 is similar to the channel 220. For example, the channel portion 320 models a set of subscriber lines such as the subscriber lines 121 in a US direction by a channel matrix H similar to the channel matrix H shown in equation (1) and the channel matrix H of the channel matrix block 221. The receiver portion 310 corresponds to a receiver portion of the DSLAM 110. The receiver portion 310 comprises a FF filter 312 similar to the FF filter 215 and a non-linear canceller 311 similar to the non-linear pre-coder 211. The FF filter 312 and the non-linear canceller 311 jointly process US signals received from all the subscriber lines on a per subcarrier basis. The system 300 uses similar QR decomposition based mechanisms to cancel US FEXT. However, QR decomposition is performed on the channel matrix H instead of the transpose of the channel matrix H as in the system 200. In the system 300, the channel matrix H is decomposed into a unitary matrix Q and an upper-triangular matrix R as shown below:

$$H = Q \times R. \quad (8)$$

The FF filter 312 is configured to operate on incoming US modulation symbols of all subscriber lines per subcarrier based on the matrix Q. The non-linear canceller 312 is coupled to the FF filter 311 and configured to operate on the outputs of the FF filter 311 based on the matrix R. For example, the non-linear canceller 312 comprises a modulo block similar to the modulo block 213 and a FB filter similar to the FB filter 214, where the FB filter comprises a transfer function similar to the transfer function shown in equation (3).

Although QR-THP is effective in removing or reducing FEXT, QR-THP may not provide an optimal performance for all CPEs. After QR decomposition, the diagonal elements of the matrix R comprise descending magnitudes. The signal-to-noise ratios (SNRs) of the CPEs' receivers are proportional to the squared magnitudes of the matrix R diagonal elements. For example, the SNR of an $m^{th}$ CPE is dependent on the magnitude of an $m^{th}$ diagonal element of the matrix R. Therefore, the number of loaded bits at a particular subcarrier on a line is dependent on the order of the lines or the CPEs at the input of the non-linear pre-coder 211 or the non-linear canceller 312. Thus, the property of the descending magnitudes along the diagonal elements of the matrix R leads to an unfair impact on the achievable data rates of the lines or the CPEs. As such, QR-THP benefits some lines at the expense of other lines. One approach to overcoming the unfairness is to rotate the line order in QR decomposition across frequencies, for example, randomly or in a round-robin order. However, performances or data rates on lines from the same distribution point may vary significantly due to different loop attenuations and/or bridged tap configurations. Thus, rotating the line order across frequencies randomly or in a round-robin order may not guarantee similar achievable data rates for all CPEs after FEXT cancellation.

Disclosed herein are various embodiments of a dynamic channel ordering scheme that employs the ordering property of QR decomposition to maximize the lowest achievable data rate of a set of channels or equalize the data rates across the set of channels. Channel ordering may be applied to any multi-channel multi-carrier communication system that comprises a non-linear pre-coding and/or non-linear post-cancellation capability on one side, for example, at a network side such as a CO. For example, channel ordering is applied in a DS direction where non-linear pre-coding is used for crosstalk pre-compensation and in a US direction where non-linear cancellation is used for crosstalk post-cancellation. Channel ordering is performed sequentially for each subcarrier. The channel order at each subcarrier is arranged in an increasing order of the total rates of the channels so that the lowest-rate channel may benefit from the ordering property of the QR decomposition. In an embodiment, the channel order is incorporated into a pre-coder or a post-canceller instead of ordering the inputs to the pre-coder or the inputs to the post-canceller, respectively. The disclosed embodiments improve the minimum achievable data rate for a set of channels. The disclosed embodiments may be applied to any DSL systems such as G.fast systems or any multi-channel multi-carrier communication systems. The disclosed embodiments may be applied in single tier service systems or multi-tier service systems.

Figure 4:
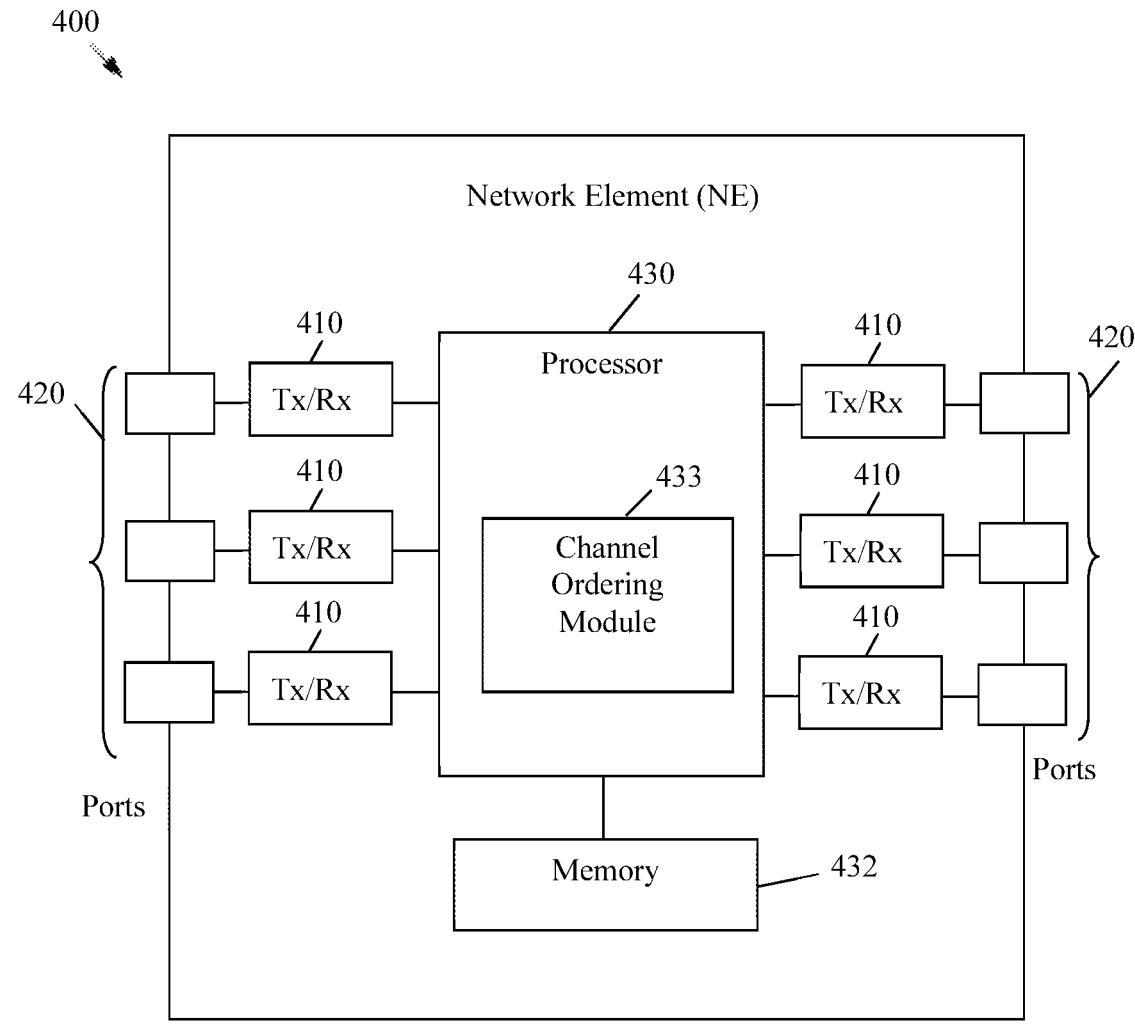
FIG. 4 is a schematic diagram of an embodiment of an NE.

FIG. 4 is a schematic diagram of an embodiment of a NE 400. The NE 400 may be a DSLAM such as the DSLAM 110, a CPE such as the CPEs 130, a transmitter such as the transmitter portion 210, a receiver such as the receiver portion 310 in a DSL system such as the DSL systems 100 and 200, depending on the embodiments. NE 400 may be configured to implement and/or support the transmission scheme adjustment and signal conditioning mechanisms and schemes described herein. NE 400 may be implemented in a single node or the functionality of NE 400 may be implemented in a plurality of nodes. One skilled in the art will recognize that the term NE encompasses a broad range of devices of which NE 400 is merely an example. NE 400 is included for purposes of clarity of discussion, but is in no way meant to limit the application of the present disclosure to a particular NE embodiment or class of NE embodiments.

At least some of the features/methods described in the disclosure are implemented in a network apparatus or component, such as an NE 400. For instance, the features/methods in the disclosure may be implemented using hardware, firmware, and/or software installed to run on hardware. The NE 400 is any device that transports packets through a network, e.g., a switch, router, bridge, server, a client, etc. As shown in FIG. 4, the NE 400 comprises transceivers (Tx/Rx) 410, which may be transmitters, receivers, or combinations thereof. The Tx/Rx 410 is coupled to a plurality of ports 420 for transmitting and/or receiving frames from other nodes.

A processor 430 is coupled to each Tx/Rx 410 to process the frames and/or determine which nodes to send the frames to. The processor 430 may comprise one or more multi-core processors and/or memory devices 432, which may function as data stores, buffers, etc. The processor 430 may be implemented as a general processor or may be part of one or more application specific integrated circuits (ASICs) and/or digital signal processors (DSPs). The processor 430 may comprise a channel ordering module 433. The channel ordering module 433 implements channel ordering as described in the scheme 500, the code 600, and the methods 700, 800, 900, 1000, and 1100, as discussed more fully below, and/or any other flowcharts, schemes, and methods discussed herein. As such, the inclusion of the channel ordering module 433 and associated methods and systems provide improvements to the functionality of the NE 400. Further, the channel ordering module 433 effects a transformation of a particular article (e.g., the DSL system) to a different state. In an alternative embodiment, the channel ordering module 433 may be implemented as instructions stored in the memory device 432, which may be executed by the processor 430.

The memory 432 comprises one or more disks, tape drives, and solid-state drives and may be used as an overflow data storage device, to store programs when such programs are selected for execution, and to store instructions and data that are read during program execution. The memory 432 may be volatile and non-volatile and may be read-only memory (ROM), random-access memory (RAM), ternary content-addressable memory (TCAM), and static random-access memory (SRAM).

Figure 5A:
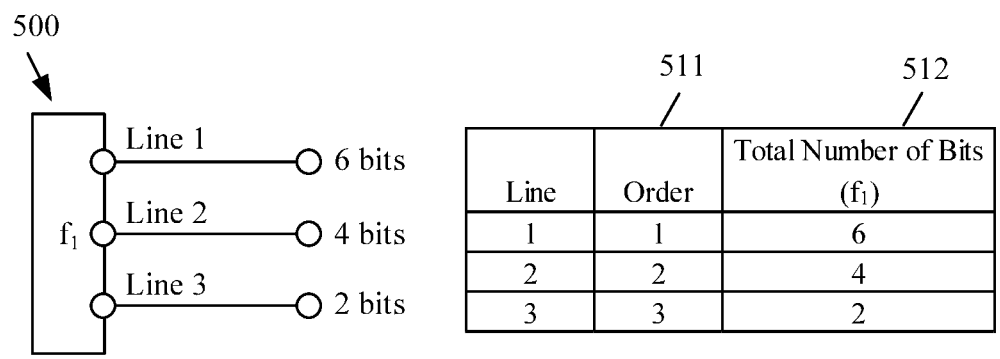
FIGS. 5A-5C collectively illustrate an embodiment of a dynamic channel ordering scheme.
Figure 5B:
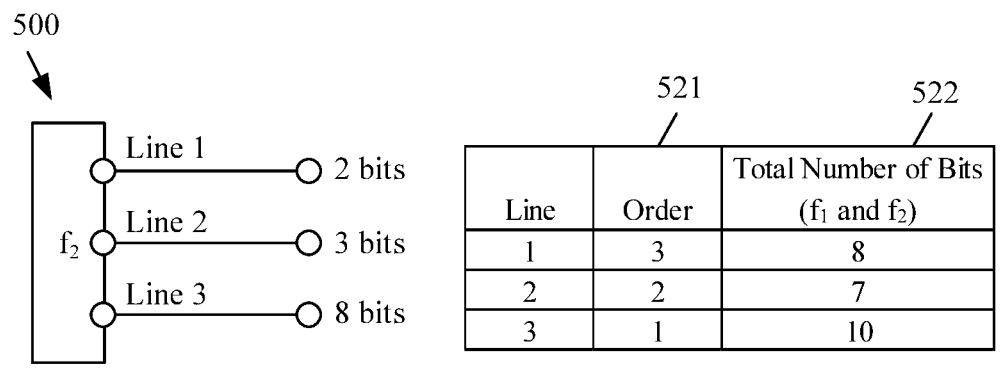
Figure 5C:
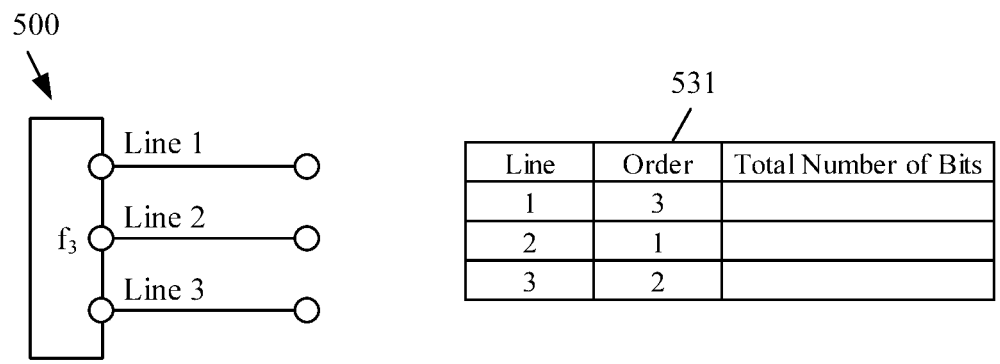

FIGS. 5A-5C collectively illustrate an embodiment of a dynamic channel ordering scheme 500. The scheme 500 is implemented by a NE such as the DSLAM 110, the transmitter portion 210, and the NE 400 in a system such as the systems 100 and 200. The scheme 500 is applied to a NE that performs non-linear pre-coding and/or non-linear post-cancellation. The scheme 500 is similar to the channel ordering method described in Miroslav Hekrdla, et al., "Ordered Tomlinson-Harashima Precoding in G.fast Downstream," IEEE Globecom 2015 On Selected Areas in Communications, December 2015, which is incorporated by reference. As described above, the matrix R obtained from the QR-THP algorithm comprises diagonal elements with decreasing magnitudes and line SNRs are proportional to the squared magnitudes of the matrix R diagonal elements. The scheme 500 uses the ordering property of QR-THP to improve the data rates of channels or lines such as the subscriber lines 121 with lower SNRs at the expense of channels or lines with higher SNRs so that the achievable data rates of all channels or lines are equalized. The scheme 500 determines a channel order by maximizing the lowest achievable rates of all channels in a group of channels or lines. For example, the system comprises N number of lines and uses K number of subcarriers for data transmission. The number of bits allocated to a $k^{th}$ subcarrier for an $n^{th}$ channel is represented by $b_k[n]$. The allocation of bits to subcarriers is referred to as bit loading, which is described more fully below. The total number of bits allocated to all subcarriers for an $n^{th}$ channel is represented by $r[n]$, which is computed as follows:

$$r[n] = \Sigma_{k=1}^{k=K} b_k[n]. \qquad (9)$$

Thus, the maximization of the lowest achievable data rates of all channels in a group of channels is expressed as follows:

$$\max\{\pi_k\} \min_{1 \leq n \leq N} r[n], \qquad (10)$$

where $\pi_k$ represents a permutation channel order at a $k^{th}$ subcarrier. To determine an optimum solution for equation (9), $K^{N!}$ solutions are required to be evaluated for the different combinations of the N number of subscriber lines and the K number of subcarriers. Instead of evaluating the $K^{N!}$ solutions, which is computationally expensive, the scheme 500 uses a low-complexity greedy approach to determine a local maximum for the equation (10).

The scheme 500 operates on a per subcarrier basis and determines a channel order for each subcarrier sequentially, for example, from a subcarrier at the highest frequency to a subcarrier at the lowest frequency. The channel order is determined based on the total number of bits allocated to all previous subcarriers. As an example, the scheme 500 illustrates the channel ordering scheme by using three channels or lines, denoted as line 1, line 2, and line 3. FIG. 5A illustrates an embodiment for determining a channel order for a first subcarrier, denoted as $f_1$. The ordering of the first subcarrier may be arbitrary. For example, the channel order sequence for the first subcarrier $f_1$ is line 1, line 2, and line 3 for the first subcarrier as shown by column 511. Assume that the number of allocated bits for the lines 1, 2, and 3 at the first subcarrier $f_1$ are 6 bits, 4 bits, and 2 bits, respectively. Thus, the total number of allocated bits for the lines 1, 2, and 3 at the first subcarrier are 6 bits, 4 bits, and 2 bits, respectively, as shown by the column 512.

FIG. 5B illustrates an embodiment for determining a channel order for a second subcarrier, denoted as $f_2$, adjacent to the first subcarrier $f_1$. The ordering of the second subcarrier is determined based on the total number of bits allocated to the first subcarrier shown in the column 512. Since the scheme 500 maximizes the lowest achievable data rates as shown in the equation (10), the channel order for the second subcarrier is arranged in so that the total numbers of bits are in an increasing order. As shown, the channel order sequence for the second subcarrier $f_2$ is line 3, line 2, and line 1 as shown by column 521. Assume that the number of allocated bits at the second subcarrier $f_2$ for the lines 1, 2, and 3 are 2 bits, 3 bits, and 8 bits, respectively. Thus, the total number of allocated bits for the lines 1, 2, and 3 at the first subcarrier $f_1$ and the second subcarrier $f_2$ are 8 bits (6+2), 7 bits (4+3), and 10 bits (2+8), respectively, as shown by the column 522.

FIG. 5C illustrates an embodiment for determining a channel order for a third subcarrier, denoted as $f_3$, adjacent to the second subcarrier $f_2$. The ordering of the third subcarrier $f_3$ is determined based on the total number of bits allocated to the first subcarrier $f_1$ and the second subcarrier $f_2$ shown in the column 522. Thus, the channel order sequence for the third subcarrier $f_3$ is line 2, line 1, and line 3 as shown by column 531.

In an embodiment, the scheme 500 performs channel ordering from high frequency to low frequency to cause higher-SNR channels to load bits on high subcarriers first, and thus lower subcarriers are more available or accessible for lower-SNR channels. In one embodiment, the scheme 500 initializes the channel order of a first subcarrier at the highest frequency in a descending order of loop attenuations or subscriber line attenuations. In another embodiment, the scheme 500 initializes the channel of a first subcarrier at the highest frequency in an arbitrary order. In some embodiments, the scheme 500 performs channel ordering on a per subcarrier group basis instead of per subcarrier to reduce computational complexity. In such embodiments, tradeoff analysis between computational complexity and performance may be performed to determine the size of the subcarrier group or the number of subcarriers in each group. The scheme 500 may be suitably applied to both US and DS direction. The scheme 500 may be applied to any multi-channel multi-carrier communication system that has non-linear pre-coding and/or post-cancellation capability on one side (e.g., office side) of the system.

In an embodiment, for single-tier service offering, where the same data rate are offered to all subscribers, the scheme 500 maximizes minimum achievable data rate of all subscribers originated from the same DSLAM and/or the same DPU assuming one channel per subscriber. In another embodiment, for two-tier service offering, the scheme 500 may be adjusted by subtracting a pre-determined rate offset from the initial bit loading of all the higher-tier channels, which leads to the maximized minimum achievable data rates of all subscribers in both tiers from the same DSLAM and/or the same DPU. In some other embodiments, for a variation of the two-tier service offering, the scheme 500 may allow a short-term, high-peak data rate for a particular subscriber and an assured data rate for all other subscribers.

FIG. 6 illustrates an embodiment of a pseudo code 600 for implementing a dynamic channel ordering scheme such as the scheme 500. The code 600 may be executed on a NE such as the DSLAM 110 and the NE 400 in a system such as the systems 100 and 200. The code 600 generates a per subcarrier channel order for a set of subscriber lines such as the subscriber lines 121 in the system. In addition, the code 600 generates parameters for per subcarrier non-linear pre-coders such as the non-linear pre-coders 211 or per subcarrier non-linear cancellers such as the non-linear cancellers 311 for FEXT mitigation. The code 600 employs similar mechanisms as the scheme 500. In one embodiment, the code 600 is executed offline by any NE after collecting measurements of channel responses of the set of subscriber lines. In another embodiment, the code 600 is executed by a DSLAM before the DSLAM enters an operational stage, where operational data is exchanged between the DSLAM and connected CPEs such as the CPEs 130. The following table describes notations used in in the code 600:

TABLE 1

Summary of Channel Ordering Notations

| Notations | Descriptions |
|---|---|
| N | Number of channels |
| K | Number of subcarriers |
| $H_k$ | A N x N FEXT channel matrix of a subcarrier k as shown in equation (1) |
| $b_k$ | A vector of loaded bits on a subcarrier k for N channels |
| r[n] | Total number of loaded bits for channel n as shown in equation (9) |
| $P_\pi$ | A N x N permutation matrix, where all elements comprises values of zeros except the element $\pi(n)$ in each column n equals 1 and $\pi(n)$ is a given permutation of N elements, $\pi: \{1, \ldots, N\} \rightarrow \{1, \ldots, N\}$. |

In the code 600, the superscript T represents matrix transposition and the symbol ∀n represents all values of n from 1 to N. For example, subcarrier 1 is positioned at a lowest frequency band of the system and subcarrier K is positioned at a highest frequency band of the system. The code 600 begins processing on the subcarrier K. At line 610, a first QR decomposition is performed on a transpose of a FEXT channel matrix of the subcarrier K, denoted as $H_K^T$, to produce a unitary matrix $Q_K$ and an upper-triangular matrix $R_K$ as shown in equation (2). At line 620, a bit loading is performed to determine a number of bits to be allocated to each subscriber line at the subcarrier K to form a per subcarrier number of bit array $b_K[n]$. For each $n^{th}$ subscriber line, the bit loading is performed according to an $n^{th}$ diagonal element of the matrix $R_K$. The computation of bit loading is described more fully below. At line 630, a total number of bit array r[n] for the set of subscriber lines is initialized to $b_K[n]$.

The loop 640 is repeated from the next highest frequency subcarrier (e.g., the subcarrier K−1) to the lowest frequency subcarrier (e.g., the subcarrier 1). In the loop 640, at line 641, a permutation channel order π is determined by sorting the total number of bits of the N channels in an ascending order. For example, the output of the permutation channel order π generates similar ordering as shown in the columns 512, 522, and 523. At line 642, a second QR decomposition is performed on $(P_\pi H_i P_\pi^T)^T$, which accounts for the channel ordering as represented by the permutation matrix $P_\pi$. At line 643, a bit loading is performed to determine a number of bits to be allocated to each subscriber line at the subcarrier i to form a temporary per subcarrier number of bit array $d_i[n]$. At line 644, the array $d_i[n]$ is re-ordered to the original channel order of the set of subscriber lines by multiplying the array $d_i[n]$ with the transpose of the permutation matrix $P_\pi$ to produce a per subcarrier number of bit array $b_i[n]$. At line 645, the total number of bit array $r[n]$ is updated by adding $b_i[n]$ to $r[n]$. It should be noted that when employing the code 600 in a US direction, the matrix transpose operations on the channel matrices are removed in lines 610 and 642, where line 610 computes QR decomposition on $H_i$ and line 642 computes QR decomposition on $(P_\pi H_i P_\pi^T)$.

Figure 7:
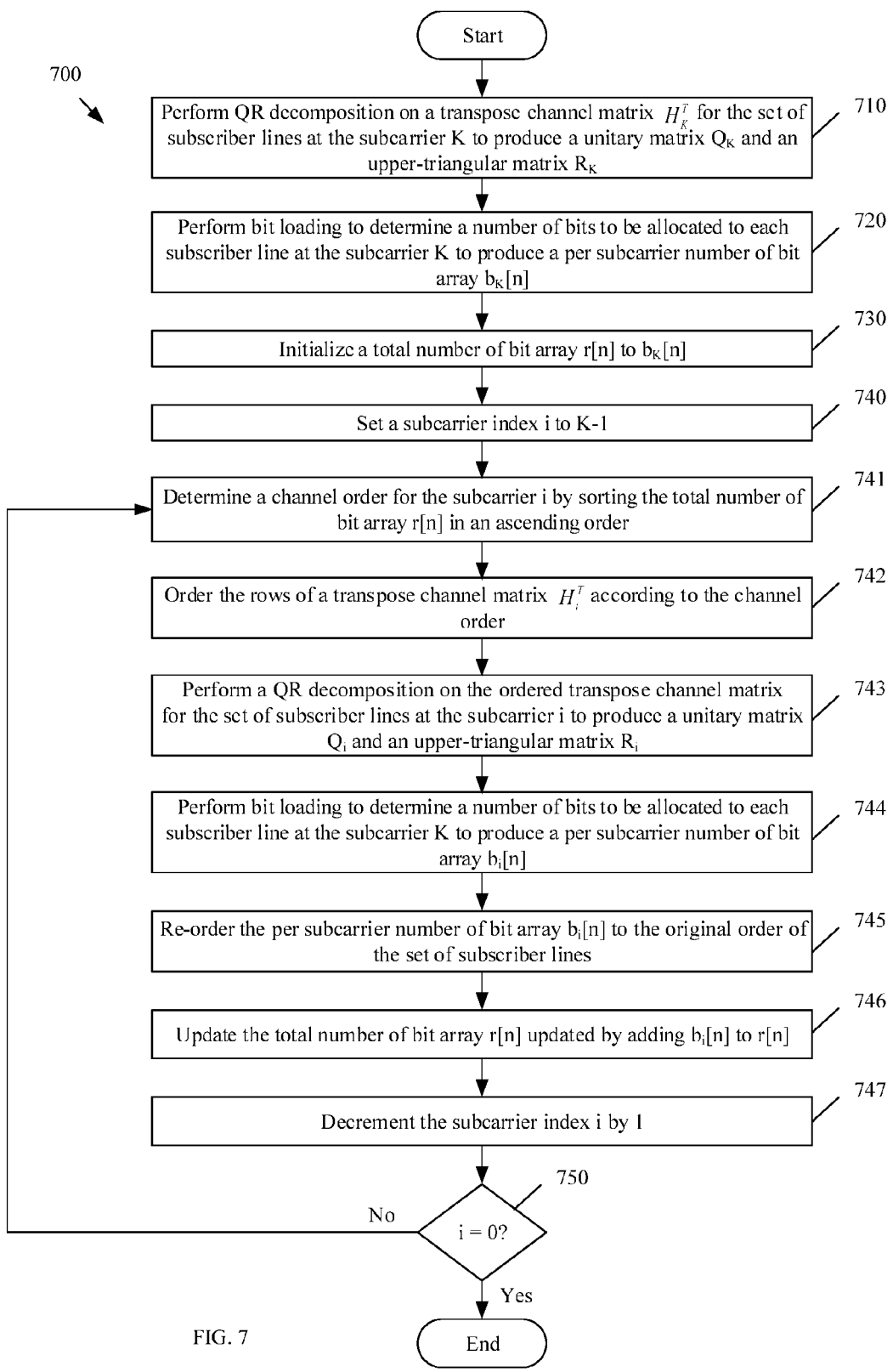
FIG. 7 is a flowchart of an embodiment of a method of generating a dynamic channel ordering scheme.

FIG. 7 is a flowchart of an embodiment of a method 700 of generating a dynamic channel ordering scheme. The method 700 is implemented by a NE such as the DSLAM 110 or the NE 400 in a system such as the systems 100 and 200. The dynamic channel ordering scheme generated by the method 700 is applied to a NE that performs non-linear pre-coding and/or non-linear post-cancellation. The method 700 employs similar mechanisms as the scheme 500 and the code 600. The method 700 is implemented after obtaining per subcarrier channel responses of a set of N subscriber lines such as the subscriber lines 121 in the system and before an operational stage, where the DSLAM begins to exchange operational data with CPEs such as the CPEs 130. The per subcarrier channel responses are represented by channel matrices $H_i$ for i from 1 to K, where K represents the number of subcarriers in the system and $H_i$ is similar to the channel matrix H shown in equation (1). For example, subcarrier 1 is positioned at a lowest frequency band of the system and subcarrier K is positioned at a highest frequency band of the system. The method 700 determines a channel order for each subcarrier sequentially from the subcarrier K at the highest frequency to the subcarrier 1 at the lowest frequency. At step 710, a QR decomposition is performed on a transpose channel matrix $H_K^T$ for the set of subscriber lines at the subcarrier K to produce a unitary matrix $Q_K$ and an upper-triangular matrix $R_K$ similar to equation (2). At step 720, a bit loading is performed to determine a number of bits to be allocated to each subscriber line at the subcarrier K to form a per subcarrier number of bit array $b_K[n]$. Bit loading may be performed using any suitable bit loading algorithm. In an embodiment, the number of bits to be allocated to a particular line is computed as follows:

$$\text{Number of bits} = \log 2\left(1 + \frac{|H_{nn}|^2 * |r_{nn}|^2 \times 10^{\frac{\text{Transmission PSD}-\text{Noise PSD}}{10}}}{10^{\frac{\text{SNR Gap}+\text{Noise Margin}-\text{Coding Gain}}{10}}}\right) \quad (11)$$

where log 2 represents a logarithmic operator in base 2, $|H_{nn}|^2$ represents a squared magnitude of an $n^{th}$ diagonal element of the channel matrix H corresponding to the $n^{th}$ subscriber line, $|r_{nn}|^2$ represents a squared magnitude of an $n^{th}$ diagonal element of the channel matrix R corresponding to the $n^{th}$ subscriber line. For example, H is set to $H_K$ for the subcarrier K. The transmit power spectral density (PSD) may be measured from a subscriber line when a signal is transmitted on subscriber line. The noise PSD is measured from a subscriber line when no signal is transmitted on subscriber line. The SNR gap is a measure of SNR reduction due to error probability. For example, the SNR gap is set to a value of about 9.8 decibel (dB). The SNR margin is a difference between an actual SNR and the required SNR for achieving synchronization in the system. For example, the SNR margin is set to a value of about 6.0 dB. The coding gain is a difference in SNR between an un-coded system and a coded system. For example, the coding gain is set to a value of about 5.0 dB. At step 730, a total number of bit array $r[n]$ for the set of subscriber lines is initialized to $b_K[n]$.

At step 740, a subcarrier index i is set to K−1. At step 741, a channel order is determined for the subcarrier i by sorting the total number of bit array $r[n]$ in an ascending order. At step 742, the rows of a transpose channel matrix $H_i^T$ is ordered according to the channel order. At step 743, a QR decomposition is performed on the ordered transpose channel matrix HT for the set of subscriber lines at the subcarrier i to produce a unitary matrix $Q_i$ and an upper-triangular matrix $R_i$ similar to equation (2). At step 744, a bit loading is performed to determine a number of bits to be allocated to each subscriber line at the subcarrier i to form a per subcarrier number of bit array $b_i[n]$. At step 745, the per subcarrier number of bit array $b_i[n]$ is re-ordered to the original order of the set of subscriber lines. At step 746, the total number of bit array $r[n]$ is updated by adding $b_i[n]$ to $r[n]$. At step 747, the subcarrier index i is decremented by 1. At step 750, a determination is made whether the subcarrier index i equals to 0. If the subcarrier index i equals to 0, the method 700 terminates. Otherwise, the method 700 repeats the steps of 741-747. When the channel matrix H represents DS channel responses, the upper triangular-matrix $R_i$ and the unitary matrix $Q_i$ are used to construct per subcarrier non-linear pre-coders such as the non-linear pre-coders 211 and corresponding per subcarrier FF filters such as the FF filters 215 for DS FEXT pre-compensation. When the channel matrix H represents US channel responses, the QR decomposition in the step 710 is performed on the channel matrix as shown in equation (8) instead of the transpose channel matrix. Thus, the row ordering operation in the step 742 is directly performed on the channel matrix. In the US direction, the upper triangular-matrix $R_i$ and the unitary matrix $Q_i$ are used to construct per subcarrier non-linear cancellers such as the non-linear cancellers 311 and corresponding per subcarrier FF filters such as the FF filters 312 for US FEXT post-cancellation.

Figure 8:
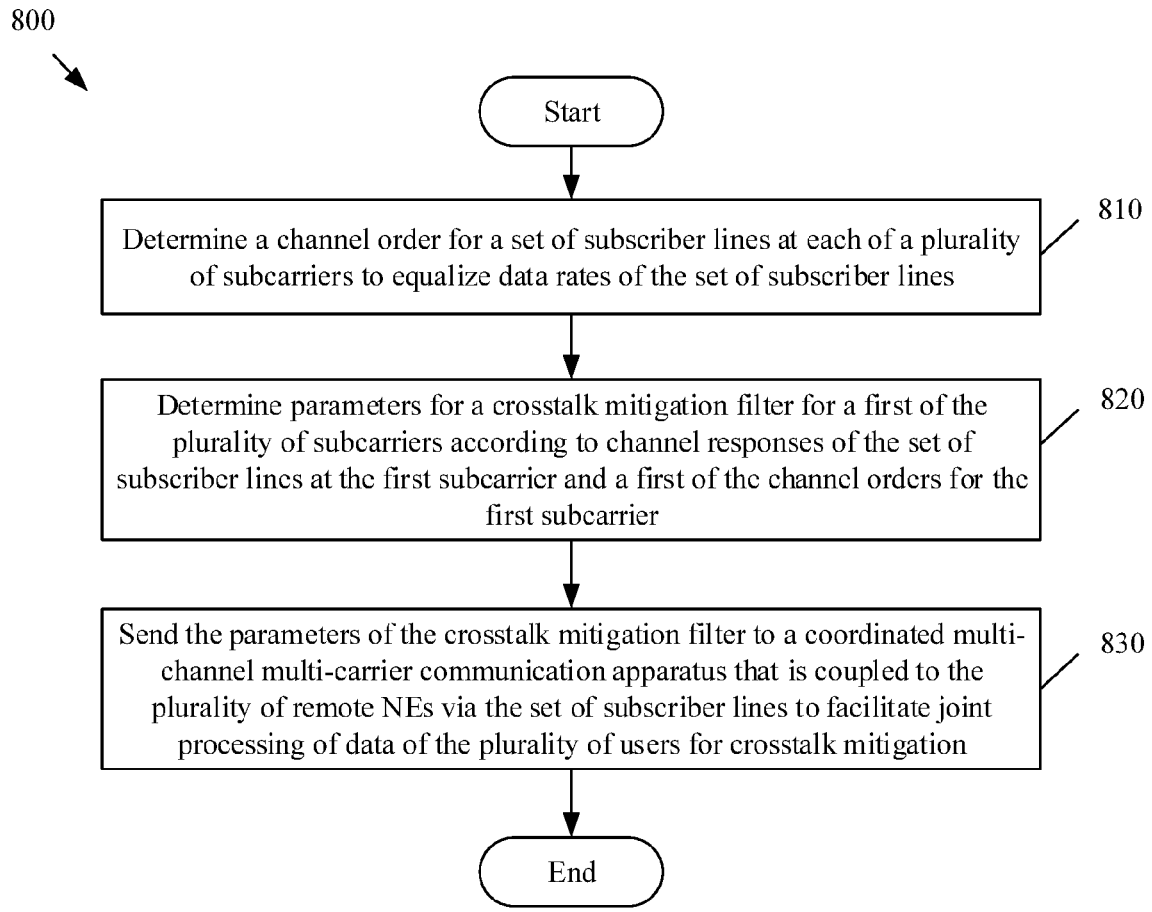
FIG. 8 is a flowchart of another embodiment of a method of generating a dynamic channel ordering scheme.

FIG. 8 is a flowchart of another embodiment of a method 800 of generating a dynamic channel ordering scheme. The method 800 is implemented by a NE such as the DSLAM 110 or the NE 400 in a system such as the systems 100 and 200. The dynamic channel ordering scheme generated by the method 800 is applied to a NE that performs non-linear pre-coding and/or non-linear post-cancellation. The method 800 employs similar mechanisms as the scheme 500, the code 600, and the method 700. The method 800 is implemented after obtaining per subcarrier channel responses of a set of N subscriber lines such as the subscriber lines 121 in the system and before an operational stage, where the DSLAM begins to exchange operational data with CPEs such as the CPEs 130. At step 810, a channel order is determined for a set of subscriber lines at each of a plurality of subcarriers to equalize data rates of the set of subscriber lines such as the subscriber lines 121. The set of subscriber lines is coupled to a plurality of remote NEs such as the CPEs 130 are associated with a plurality of users. For example, the method 800 searches for a local maximum for the equation (9) by using mechanisms described in the scheme 500, the code 600, and the method 700. At step 820, parameters for a crosstalk mitigation filter are determined for a first of the plurality of subcarriers according to channel responses of the set of subscriber lines at the first subcarrier and a first of the channel orders for the first subcarrier. For example, the channel responses for the set of subscriber lines at the first subcarrier are represented by a channel matrix similar to the channel matrix H described in the equation (1). In one embodiment, the crosstalk mitigation filter is a non-linear pre-coder similar to the non-linear pre-coder 211 for FEXT pre-compensation. In another embodiment, the crosstalk mitigation filter is a non-linear canceller similar to the non-linear canceller 311 for FEXT post-cancellation. The parameters correspond to a unitary Q matrix and a triangular matrix, which are obtained by ordering rows of the channel matrix and performing a QR decomposition on the transpose of the ordered channel matrix as shown in the lines 642 and the steps 741-743. When the crosstalk mitigation filter is used for FEXT cancellation, the QR decomposition is performed on the channel matrix instead of the transpose of the channel matrix as shown in equation (8). At step 830, the parameters of the crosstalk mitigation filter are sent to a coordinated multi-channel multi-carrier communication apparatus such as the DSLAM 110 that is coupled to the plurality of remote NEs via the set of subscriber lines to facilitate joint processing of data of the plurality of users for crosstalk mitigation.

Figure 9:
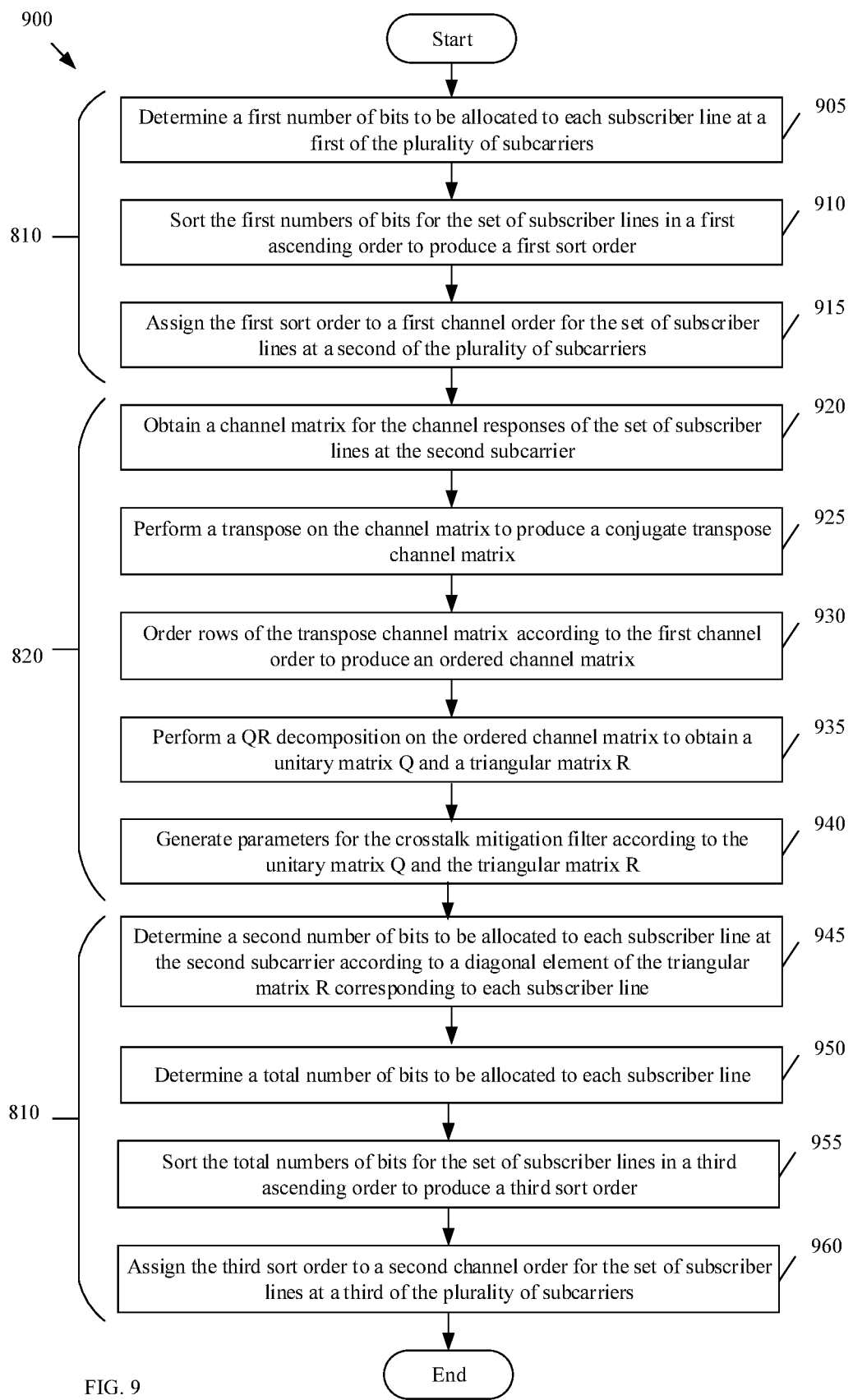
FIG. 9 is a flowchart of another embodiment of a method of generating a dynamic channel ordering scheme.

FIG. 9 is a flowchart of another embodiment of a method 900 of generating a dynamic channel ordering scheme. The method 900 is implemented by a NE such as the DSLAM 110 or the NE 400 in a system such as the systems 100 and 200. The method 900 employs similar mechanisms as the scheme 500, the code 600, and the methods 700 and 800. The method 900 is implemented after obtaining per subcarrier channel responses of a set of N subscriber lines such as the subscriber lines 121 in the system and before an operational stage, where the DSLAM begins to exchange operational data with CPEs such as the CPEs 130. The method 900 illustrates more details of the steps 810 and 820. At step 905, a first number of bits to be allocated to each subscriber line at a first of the plurality of subcarriers is determined, for example, performing operations as described at the lines 610-630 and the steps 710-730. At step 910, the first numbers of bits for the set of subscriber lines are sorted in a first ascending order to produce a first sort order. At step 915, the first sort order is assigned to a first channel order for the set of subscriber lines at a second of the plurality of subcarriers. The second subscriber is adjacent to the first subscriber. The steps 910 and 915 corresponds to the line 641 and the step 741.

At step 920, a channel matrix for the channel responses of the set of subscriber lines at the second subcarrier is obtained. The channel matrix is similar to the channel matrix H shown in the equation (1). At step 925, a transpose is performed on the channel matrix to produce a transpose channel matrix. At step 930, rows of the transpose channel matrix are ordered according to the first channel order to produce an ordered channel matrix. At step 935, a QR decomposition is performed on the ordered channel matrix to obtain a unitary matrix Q and a triangular matrix R. The steps 920-935 correspond to the line 642 and the steps 742 and 743.

At step 940, parameters of the crosstalk mitigation filter are generated according to the unitary matrix Q and the triangular matrix R. For example, in a DS direction, the crosstalk mitigation filter comprises a non-linear pre-coder similar to the non-linear pre-coder 211, where the parameters are dependent on the triangular matrix R as shown in the equation (3). Alternatively, in a US direction, the crosstalk mitigation filter comprises a non-linear canceller similar to the non-linear canceller 311, where the matrix transpose operation in the step 925 is removed, the row ordering operation in the step 930 is directly performed on the channel matrix, and the parameters are dependent on the triangular matrix R as shown in equation (3).

At step 945, a second number of bits to be allocated to each subscriber line at the second subcarrier is determined according to a diagonal element of the triangular matrix R corresponding to each subscriber line, for example, according to the equation (11). At step 950, a total number of bits to be allocated for each subscriber line is determined by summing a corresponding first number of bits and a corresponding second number of bits of each subscriber line. The steps 945 and 950 correspond to the line 645 and the steps 744 to 746.

At step 955, the total numbers of bits for the set of subscriber lines are sorted in a third ascending order to produce a third sort order. At step 960, the third sort order is assigned to a second channel order for the set of subscriber lines at a third of the plurality of subcarriers. In an embodiment, the first subcarrier is positioned at a highest frequency band of the system and the second subcarrier and the third subcarrier are consecutive subcarrier adjacent to the first subcarrier. In one embodiment, the channel order for the first subcarrier is arbitrarily selected. In another embodiment, the channel order for the first subcarrier is assigned according to a descending order of loop attenuations of the set of subscriber lines or an ascending order of line SNRs of the set of subscriber lines. In an embodiment, the method 900 searches for a local maximum for equation (9) in terms of groups of subcarriers. In such an embodiment, in the step 905, the first number of bits is determined for allocation to a group subcarriers instead of a single subcarrier. Similarly, in the step 915, the first sort order is used for ordering an adjacent group of subcarriers instead of an adjacent subcarrier.

Figure 10:
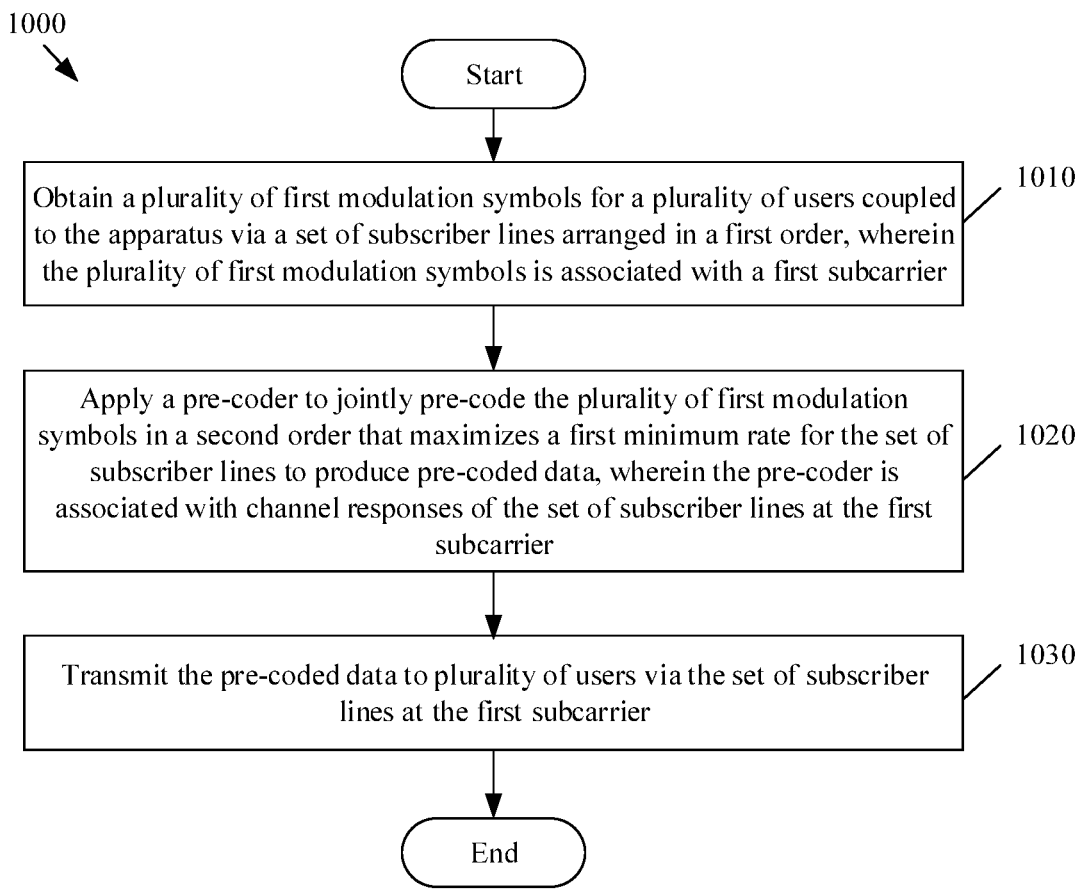
FIG. 10 is a flowchart of an embodiment of a method of performing vectored-based pre-coding according to a dynamic channel ordering scheme.

FIG. 10 is a flowchart of an embodiment of a method 1000 of performing vectored-based pre-coding according to a dynamic channel ordering scheme such as the scheme 500 in a system such as the systems 100 and 200. The method 1000 is implemented by a multi-channel multi-carrier communication apparatus such as the DSLAM 110 or the NE 400. The method 1000 is implemented after obtaining parameters of a per subcarrier pre-coder such as the non-linear pre-coder 211 for each of a plurality of subcarriers in the system. The pre-coders are determined by employing the code 600, and the methods 700, 800, and 900. For example, the method 1000 is used to pre-compensate DS FEXT. At step 1010, a plurality of first modulation symbols is obtained for a plurality of users associated with a plurality of NEs such as the CPEs 130 coupled to the apparatus via a set of subscriber lines such as the subscriber lines 121 arranged in a first order. The plurality of first modulation symbols is associated with a first subcarrier. For example, the first modulation symbols each correspond to $u_i$ in equation (4). At step 1020, a pre-coder is applied to jointly pre-code the plurality of first modulation symbols in a second order that maximizes a first minimum rate for the set of subscriber lines to produce pre-coded data. The pre-coder is associated with channel responses of the set of subscriber lines at the first subcarrier. For example, the channel responses of the set of subscriber lines at the first subcarrier are represented by a channel matrix as shown in the equation (1). The pre-coder comprises a similar structure as the non-linear pre-coder 211. For example, the pre-coder comprises a FB filter similar to the FB filter 214. The FB filter is dependent on a triangular matrix R as shown in the equation (3). The triangular matrix R is obtained from a QR decomposition of an ordered transpose of the channel matrix H as shown in equation (2). At step 1030, the pre-coded data is transmitted to the plurality of users via the set of subscriber lines at the first subcarrier.

Figure 11:
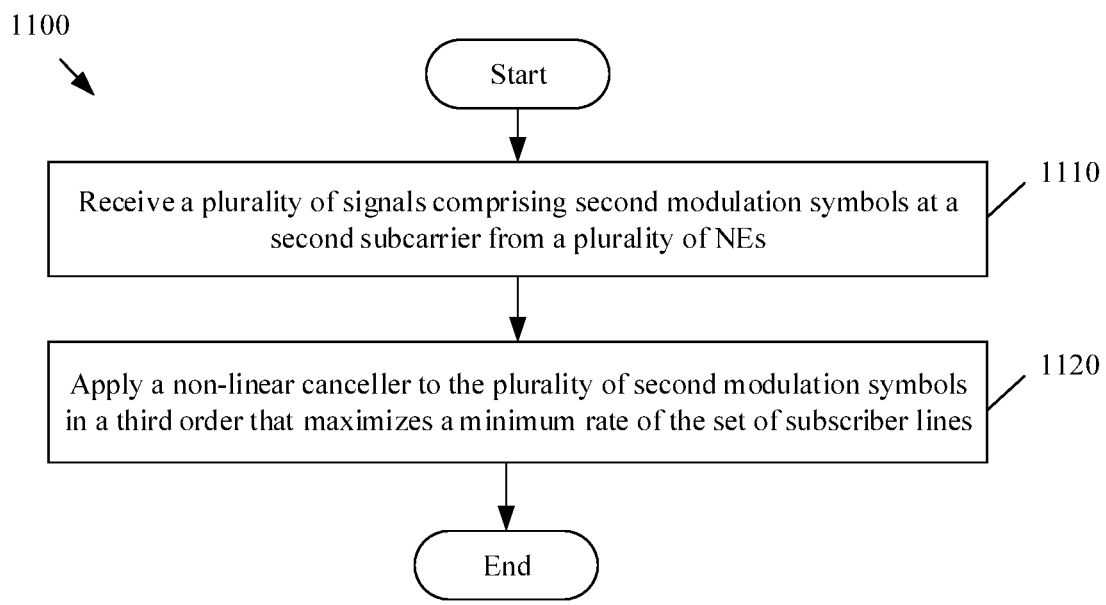
FIG. 11 is a flowchart of an embodiment of a method of performing vectored-based post-cancellation according to a dynamic channel ordering scheme.

FIG. 11 is a flowchart of an embodiment of a method 1100 of performing vectored-based post-cancellation according to a dynamic channel ordering scheme such as the scheme 500 in a system such as the systems 100 and 200. The method 1100 is implemented by a multi-channel multi-carrier communication apparatus such as the DSLAM 110 or the NE 400. The method 1100 is implemented after obtaining parameters of a per subcarrier canceller such as the non-linear canceller 311 for each of a plurality of subcarriers in the system. The cancellers are determined by employing the code 600, and the methods 700, 800, and 900. For example, the method 1100 is used to cancel US FEXT. At step 1110, a plurality of signals comprising second modulation symbols at a second subcarrier from a plurality of NEs such as the CPEs 130. For example, the multi-channel multi-carrier communication apparatus is coupled to the plurality of NEs via a set of subscriber lines similar to the subscriber lines 121 arranged in a first order. At step 1120, a non-linear canceller is applied to the plurality of second modulation symbols in a third order that maximizes a minimum rate of the set of subscriber lines. The non-linear canceller comprises a FB filter similar to the FB filter 214. After applying the non-linear canceller, the method 1100 may perform further processing to decode the original data carried in the second modulation symbols.

Figure 12:
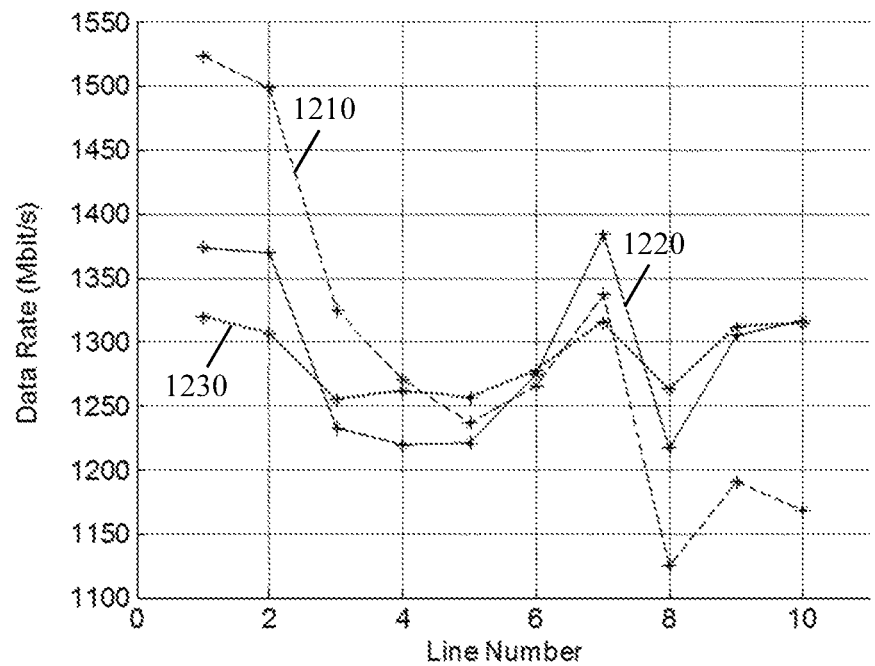
FIG. 12 is a graph of an embodiment comparing simulated data rates obtained from a fixed channel ordering scheme, an inverse channel ordering scheme, and a dynamic ordering scheme.
Figure 13:
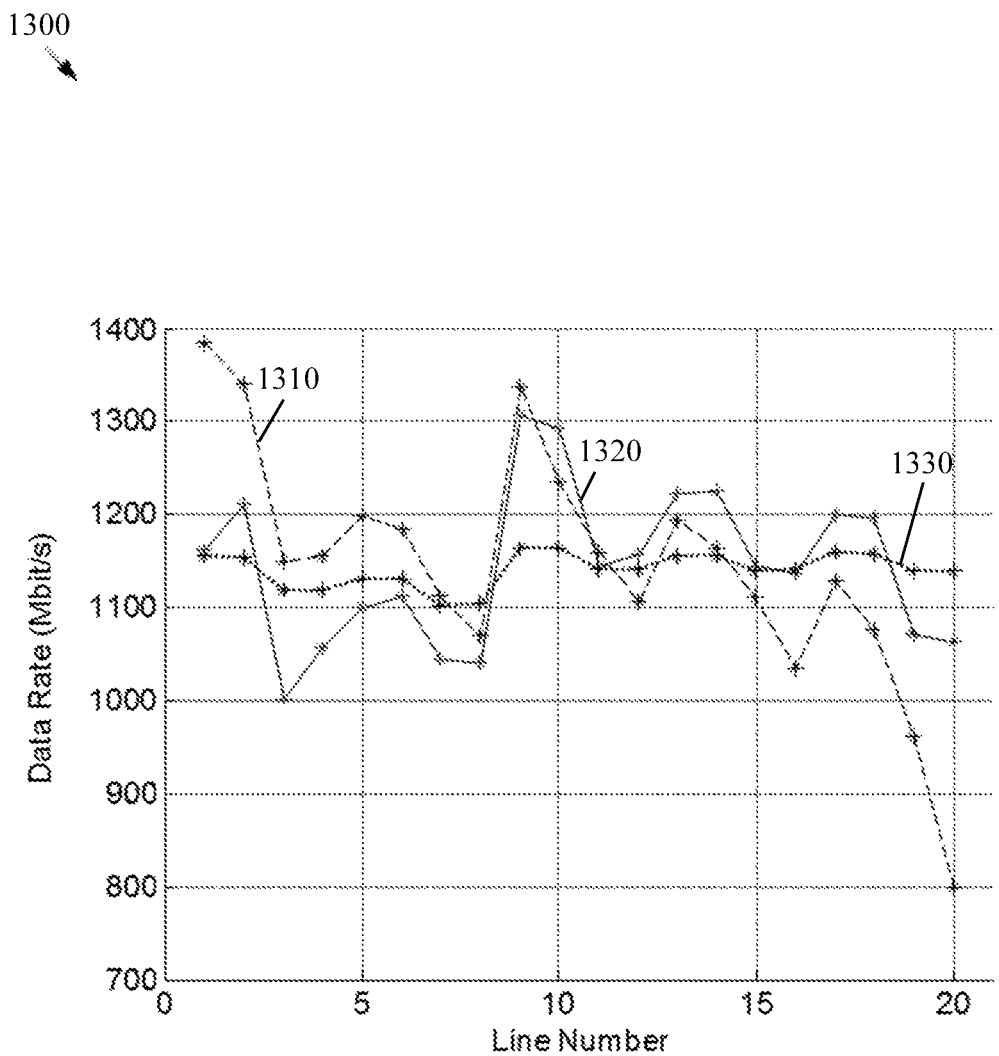
FIG. 13 is a graph of another embodiment comparing simulated data rates obtained from a fixed channel ordering scheme, an inverse channel ordering scheme, and a dynamic ordering scheme.

FIGS. 12 and 13 compare performances of QR-THP with a fixed channel ordering scheme, an inverse channel ordering scheme, and a dynamic channel ordering scheme in a DSL system such as the systems 100 and 200. The x-axes represent line number. The y-axes represent data rate in units of megabits per second (Mbit/s). The fixed channel ordering scheme uses the same channel order for all subcarriers according to a line order of a set of subscriber lines such as the subscriber lines 121. The inverse channel ordering scheme uses a same channel order for all odd-indexed subcarriers and a reversed or an inversed channel order for all even-indexed subcarriers. The dynamic channel order scheme uses mechanisms described in the scheme 500, the code 600, and the methods 700-1000. The performances are generated from a simulation with the following configuration parameters:

TABLE 1

Simulation Configuration Parameters

| Frequency Band | 2.2 megahertz (MHz)-212 MHz |
| SNR Gap | 9.8 dB |
| SNR Margin | 6.0 dB |
| Net Coding Gain | 5.0 dB |
| Transmit PSD (before pre-coding) | −76 decibel milliwatt per hertz (dBm/Hz) |
| Noise Floor | −140 dBm/Hz |

FIG. 12 is a graph 1200 of an embodiment comparing simulated data rates obtained from the fixed channel ordering scheme, the inverse channel ordering scheme, and the dynamic ordering scheme. The graph 1200 is generated based on British telecom (BT) cable measurements. The curve 1210 shows simulated data rates when QR-THP is implemented with the fixed channel ordering scheme. The curve 1220 shows simulated data rates when QR-THP is implemented with the inversed channel ordering scheme. The curve 1230 shows simulated data rates when QR-THP is implemented with the dynamic channel ordering scheme. Comparing the curves 1210-1230, the curve 1230 achieves a greatest minimum data rate as expected when employing the dynamic channel ordering scheme. In addition, the dynamic channel ordering scheme provides small variations in the data rates across all lines, thus the data rates of the lines are equalized.

FIG. 13 is a graph 1300 of another embodiment comparing simulated data rates obtained from the fixed channel ordering scheme, the inverse channel ordering scheme, and the dynamic ordering scheme. The graph 1300 is generated based on Swisscom cable measurements. The curve 1310 shows simulated data rates when QR-THP is implemented with the fixed channel ordering scheme. The curve 1320 shows simulated data rates when QR-THP is implemented with the inversed channel ordering scheme. The curve 1330 shows simulated data rates when QR-THP is implemented with the dynamic channel ordering scheme. Similar to the graph 1200, the curve 1330 obtained from the dynamic channel ordering scheme achieves a greatest minimum data rate and comprises less variation across the lines than the curves 1310 and 1320.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented in a network element (NE), comprising:

determining, via a processor of the NE, a channel order for a set of subscriber lines at each of a plurality of subcarriers to equalize data rates of the set of subscriber lines, wherein the set of subscriber lines is coupled to a plurality of remote NEs associated with a plurality of users;

determining, via the processor, parameters for a crosstalk mitigation filter for a first subcarrier from the plurality of subcarriers according to channel responses of the set of subscriber lines at the first subcarrier and a first channel order from the channel orders for the first subcarrier; and sending, via a transmitter of the NE, parameters of the crosstalk mitigation filter to a coordinated multi-channel multi-carrier communication apparatus that is coupled to the plurality of remote NEs via the set of subscriber lines to facilitate joint processing of data of the plurality of users for crosstalk mitigation.

2. The method of claim 1, wherein determining the parameters for the crosstalk mitigation filter for the first subcarrier comprises:
   obtaining a channel matrix for the channel responses of the set of subscriber lines at the first subcarrier;
   ordering rows of the channel matrix according to the first channel order to produce an ordered channel matrix;
   perform QR decomposition on the ordered channel matrix to obtain a unitary matrix Q and a triangular matrix R; and
   generating the parameters of the crosstalk mitigation filter according to the unitary matrix Q and the triangular matrix R.

3. The method of claim 2, wherein the multi-channel multi-carrier apparatus is a digital subscriber line access multiplexer (DSLAM), wherein the plurality of remote NEs are customer premise equipments (CPEs), wherein the channel responses are downstream (DS) channel responses from the DSLAM to the CPEs, wherein the crosstalk mitigation filter is a DS far-end crosstalk (FEXT) pre-coder, and wherein the method further comprises performing a transpose on the channel matrix prior to ordering the rows of the channel matrix.

4. The method of claim 2, wherein the multi-channel multi-carrier apparatus is a digital subscriber line access multiplexer (DSLAM), wherein the plurality of remote NEs are customer premise equipments (CPEs), wherein the channel responses are upstream (US) channel responses from the plurality of CPEs to the DSLAM, and wherein the crosstalk mitigation filter is a US far-end crosstalk (FEXT) canceller.

5. The method of claim 2, wherein determining the channel orders for the set of subscriber lines comprises:
   determining a second number of bits to be allocated to each subscriber line at a second subcarrier of the plurality of subcarriers;
   sorting the second numbers of bits for the set of subscriber lines in a first ascending order to produce a first sort order; and
   assigning the first sort order to the first channel order for the set of subscriber lines at the first subcarrier.

6. The method of claim 5, wherein determining the channel orders for the set of subscriber lines further comprises:
   determining a first number of bits to be allocated to each subscriber line at the first subcarrier according to a diagonal element of the triangular matrix R corresponding to each subscriber line;
   determining a total number of bits to be allocated to each subscriber line by summing a corresponding first number of bits and a corresponding second number of bits;
   sorting the total numbers of bits for the set of subscriber lines in a third ascending order to produce a third sort order; and
   assigning the third sort order to a third channel order of the channel orders for the set of subscriber lines at a third subcarrier of the plurality of subcarriers.

7. The method of claim 6, wherein determining the channel orders for the set of subscriber lines further comprises determining the channel orders sequentially from a highest subcarrier of the plurality of subcarriers to a lowest subcarrier of the plurality of subcarriers, wherein the first subcarrier is positioned between the second subcarrier and the third subcarrier in a frequency spectrum, and wherein the second subcarrier is the highest subcarrier.

8. The method of claim 7, wherein determining the channel orders for the set of subscriber lines further comprises assigning an arbitrary order to a second of the channel orders for the set of subscriber lines at the second subcarrier.

9. The method of claim 7, wherein determining the channel orders for the set of subscriber lines further comprises:
   sorting attenuations of the set of subscriber lines at the second subcarrier in a descending order to produce a second sort order; and
   assigning the second sort order to a second of the channel orders for the set of subscriber lines at the second subcarrier.

10. The method of claim 1, wherein determining the channel orders for the set of subscriber lines comprises:
    determining a first number of bits to be allocated to each subscriber line at a first group of the plurality of subcarriers;
    sorting the first numbers of bits for the set of subscriber lines in a first ascending order to produce a first sort order; and
    assigning the first sort order to a second group of the channel orders for the set of subscriber lines at a second group of the plurality of subcarriers, and
    wherein the first group of the plurality of subcarriers is adjacent to the second group of the plurality of subcarriers in a frequency spectrum.

11. A multi-channel multi-carrier communication apparatus comprising:
    a plurality of transmitters coupled to a plurality of network elements (NEs) associated with a plurality of users via a set of subscriber lines arranged in a first order;
    a processor coupled to the plurality of transmitters and configured to:
      obtain a plurality of first modulation symbols for the plurality of users, wherein the plurality of first modulation symbols is associated with a first subcarrier; and
      apply a pre-coder to jointly pre-code the plurality of first modulation symbols in a second order that maximizes a first minimum rate for the set of subscriber lines to produce pre-coded data, wherein the pre-coder is associated with first channel responses of the set of subscriber lines at the first subcarrier; and
    a transmitter coupled to the processor and configured to transmit the pre-coded data to the plurality of NEs via the set of subscriber lines at the first subcarrier.

12. The apparatus of claim 11, wherein the first channel responses of the set of subscribe lines at the first subcarrier are represented by a channel matrix, wherein diagonal elements of the channel matrix are associated with direct channels of the set of subscriber lines, wherein off-diagonal elements of the channel matrix are associated with far-end crosstalk (FEXT) channels among the set of subscriber lines, wherein rows of the channel matrix are in the first order, wherein the pre-coder is a non-linear pre-coder dependent on an ordered channel matrix corresponding to a first transpose of the channel matrix with the rows arranged in the second order, and wherein the second order corresponds to a third order of the set of subscriber lines arranged in an ascending order of number of bits allocated to the set of subscriber lines at one or more subcarriers.

13. The apparatus of claim 12, wherein the non-linear pre-coder comprises a feedback (FB) filter comprising a transfer function as shown below:

$$I-\mathrm{diag}(R)^{-1} \times R^T$$

where I represents an identity matrix, R represents a triangular matrix based on a QR decomposition of the ordered channel matrix, $\mathrm{diag}(R)^{-1}$ represents an inverse of diagonal elements of the triangular matrix, and $R^T$ represents a second transpose of the triangular matrix.

14. The apparatus of claim 13, wherein the processor is further configured to apply a feedforward (FF) filter to the pre-coded data according to a unitary matrix Q based on the QR decomposition of the first transpose of the ordered channel matrix.

15. The apparatus of claim 11, wherein the first minimum rate of the set of subscriber lines is in a first direction from the apparatus to the plurality of NEs, wherein the apparatus further comprises a receiver configured to receive a plurality of signals comprising a plurality of second modulation symbols at a second subcarrier from the plurality of NEs, wherein the processor is further configured to apply a non-linear canceller to the plurality of second modulation symbols in a third order that maximizes a second minimum rate of the set of subscriber lines in a second direction from the plurality of NEs to the apparatus, and wherein the non-linear canceller is associated with second channel responses of the set of subscriber line in the second direction at the second subcarrier.

16. The apparatus of claim 15, wherein the second channel responses of the set of subscriber lines are represented by a channel matrix, wherein diagonal elements of the channel matrix are associated with direct channels of the set of subscriber lines in the second direction, wherein off-diagonal elements of the channel matrix are associated with far-end crosstalk (FEXT) channels among the set of subscriber lines in the second direction, wherein rows of the channel matrix are in the first order, wherein the non-linear canceller comprises a feedback (FB) filter dependent on an ordered channel matrix corresponding to the channel matrix with the rows arranged in the third order, and wherein the FB filter comprises a transfer function as shown below:

$$I-\mathrm{diag}(R)^{-1} \times R^T$$

where I represents an identity matrix, R represents a triangular matrix based on a QR decomposition of the ordered channel matrix, $\mathrm{diag}(R)^{-1}$ represents an inverse of diagonal elements of the triangular matrix, and $R^T$ represents a third transpose of the triangular matrix.

17. The apparatus of claim 11, wherein the apparatus is a digital subscriber line access multiplexer (DSLAM), and wherein the plurality of NEs are customer premise equipments (CPEs).

18. A method implemented by a multi-channel multi-carrier communication apparatus, the method comprising:
obtaining a plurality of first modulation symbols for a plurality of users associated with a plurality of network elements (NEs) coupled to the apparatus via a set of subscriber lines arranged in a first order, wherein the plurality of first modulation symbols is associated with a first subcarrier;
applying a pre-coder to jointly pre-code the plurality of first modulation symbols in a second order that maximizes a minimum rate for the set of subscriber lines to produce pre-coded data, wherein the pre-coder is associated with channel responses of the set of subscriber lines at the first subcarrier; and
transmitting the pre-coded data to the plurality of users via the set of subscriber lines at the first subcarrier.

19. The method of claim 18, wherein the channel responses of the set of subscribe lines are represented by a channel matrix, wherein diagonal elements of the channel matrix are associated with direct channels of the set of subscriber lines, wherein off-diagonal elements of the channel matrix are associated with far-end crosstalk (FEXT) channels among the set of subscriber lines, wherein rows of the channel matrix correspond to the set of subscriber lines in the first order, wherein the pre-coder is dependent on an ordered channel matrix corresponding to a first transpose of the channel matrix with the rows arranged in the second order, and wherein the second order corresponds to a third order of the set of subscriber lines arranged in an ascending order of number of bits allocated to the set of subscriber lines at one or more subcarriers.

20. The method of claim 18, wherein the pre-coder is a QR-based Tomlinson-Harashima pre-coder (QR-THP) ordered according to the second order, and wherein the pre-coder comprises a feedback (FB) filter comprising a transfer function as shown below:

$$I-\mathrm{diag}(R)^{-1} \times R^T$$

where I represents an identity matrix, R represents a triangular matrix based on a QR decomposition of a first transpose of the ordered channel matrix, and $R^T$ represents a second transpose of the triangular matrix.

* * * * *

UNITED STATES PATENT AND TRADEMARK OFFICE
CERTIFICATE OF CORRECTION

PATENT NO. : 9,544,423 B2  Page 1 of 1
APPLICATION NO. : 15/087496
DATED : January 10, 2017
INVENTOR(S) : Dong Wei It is certified that error appears in the above-identified patent and that said Letters Patent is hereby corrected as shown below:

On the Title Page

Item (56), On page 2, Column 2, Line 17, References Cited, Other Publications should read:

R. Fischer and C. Windpassinger, "Improved MIMO Precoding for Decentralized Receivers Resembling Concepts from Lattice Reduction," Global Telecommunications Conference, 2003. GLOBECOM '03. IEEE, vol. 4, December 2003, pp. 1852–1856.

Signed and Sealed this
Eleventh Day of April, 2017

Michelle K. Lee
*Director of the United States Patent and Trademark Office*